US012754442B2

(12) United States Patent
Pruitt et al.

(10) Patent No.: US 12,754,442 B2
(45) Date of Patent: Oct. 6, 2026

(54) CONTACT LENSES WITH COLOR FILTERING ZONE

(71) Applicant: Alcon Inc., Fribourg (CH)

(72) Inventors: John Dallas Pruitt, Suwanee, GA (US); Xin Hong, Fort Worth, TX (US); Ying Pi, Cumming, GA (US); David Borja, Suwanee, GA (US); Joseph Michael Lindacher, Suwanee, GA (US); Claire Elizabeth Nason-Tomaszewski, Atlanta, GA (US); Cécile Adrienne Maissa, Fort Worth, TX (US); Adam K. Sniady, Lilburn, GA (US); Guillermo Marcos Perez Sanchez, Fort Worth, TX (US); Young Hyun Kim, Buford, GA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 19/386,939

(22) Filed: Nov. 12, 2025

(65) Prior Publication Data

US 2026/0133439 A1 May 14, 2026

Related U.S. Application Data

(60) Provisional application No. 63/720,225, filed on Nov. 14, 2024.

(51) Int. Cl.
*G02C 7/10* (2006.01)

(52) U.S. Cl.
CPC .................................... *G02C 7/108* (2013.01)

(58) Field of Classification Search
CPC .. G02C 7/04; G02C 7/041; G02C 7/044–049; G02C 7/108

(Continued)

(56) References Cited

U.S. PATENT DOCUMENTS 5,433,898 A * 7/1995 Thakrar ................. G02C 7/049
264/2.7
7,971,996 B2 7/2011 Drobe et al.
(Continued)

FOREIGN PATENT DOCUMENTS

JP 2024152900 A 10/2024
TW 201426086 A 7/2014
(Continued)

OTHER PUBLICATIONS

Timothy J. Gawne, et al., The effects of intensity, spectral purity and duty cycle on red light- induced hyperopia in tree shrews, Ophthalmic and Physiological Optics, 43 (6), 1419-1426, 2023.

*Primary Examiner* — Travis S Fissel
(74) *Attorney, Agent, or Firm* — Nicholas Smith

(57) ABSTRACT

The present disclosure is directed to contact lenses configured to prevent or slow development of myopia. In some embodiments, a contact lens for slowing the progression of myopia includes a circular first zone extending from an optical center of the contact lens to a first boundary. The first zone has a first visible light transmission profile. The contact lens includes an annular second zone abutting the first zone at the first boundary. The annular second zone at least partially surrounds the first zone and extends from the first boundary to a second boundary. The second zone has the same dioptric power as a dioptric power of the first zone. The second zone has a second visible light transmission profile that is different than the first transmission profile and is a blue light transmission profile.

25 Claims, 2 Drawing Sheets

(58) Field of Classification Search
USPC ............ 351/159.02, 159.12, 159.24, 159.29, 351/159.3, 159.32
See application file for complete search history.

(56) References Cited

U.S. PATENT DOCUMENTS

| | | | |
|---|---|---|---|
| 8,096,656 | B2 | 1/2012 | Giraudet |
| 9,104,042 | B2 | 8/2015 | Bowers et al. |
| 9,664,927 | B2 | 5/2017 | Wright et al. |
| 11,520,166 | B2 | 12/2022 | Wright et al. |
| 2018/0373059 | A1* | 12/2018 | Lin ........................ G02C 7/061 |
| 2019/0196071 | A1* | 6/2019 | Barrett .............. G02F 1/133514 |
| 2021/0271109 | A1 | 9/2021 | Yao et al. |
| 2021/0278700 | A1 | 9/2021 | Barbur |
| 2022/0155615 | A1 | 5/2022 | Iguchi et al. |
| 2022/0342233 | A1 | 10/2022 | Gawne et al. |
| 2023/0096315 | A1 | 3/2023 | Awasthi et al. |
| 2024/0216823 | A1 | 7/2024 | Diamant et al. |

FOREIGN PATENT DOCUMENTS

| | | | |
|---|---|---|---|
| WO | 2018076057 | A1 | 5/2018 |
| WO | 2023172449 | A2 | 9/2023 |

* cited by examiner

CONTACT LENSES WITH COLOR FILTERING ZONE

FIELD

The present disclosure is directed to contact lenses configured to prevent or slow development of myopia.

BACKGROUND

In children, a self-correcting mechanism adjusts the growth of the eye so that the light-sensitive retina is located where images of the visual world are focused (the focal plane), producing clearly focused vision ("emmetropia"). This mechanism uses visual cues to determine if the eye is too short (hyperopia) or has grown too long (myopia) relative to the focal plane and adjusts eye growth to move the retina back to emmetropia. However, this mechanism allows the eyes to become too long so they are myopic (nearsighted). Myopia is particularly prevalent for people who spend much of their time indoors. High amounts of myopia raise the risks of developing retinal holes or tears, retinal detachment, choroidal degeneration, glaucoma, cataract, and other potentially blinding conditions caused by the elongated eye. Current treatments aimed at preventing or slowing the development of myopia have achieved only modest success. For example, the economic cost of glasses, contact lenses, and refractive surgery is many millions of dollars in the U.S. alone, and these treatments thus far do not remove the risk of blindness because they do not alter the length of the eye and so the affected eye remains elongated.

Myopia predominantly develops and increases (progresses) in childhood between the ages of 5 and 15. Slowing myopia development would involve treatment throughout this extended period and thus such treatment should be safe for long-term, extended use. Companies are trying to develop effective ways to prevent children from developing myopia or to slow the rate of myopia development to reduce the final amount of myopia in adulthood. For example, low-dose atropine has been used as a pharmaceutical approach. However, besides the side effects of reducing the amplitude of accommodation and slight mydriasis, atropine dilates the pupil and increases higher order aberration and reduction of visual quality.

Optical approaches have also been attempted with refractive or light scattering optical approaches finding limited efficacy. In particular, the current refractive strategies for myopia control, including ortho-keratology lenses, multi-segment spectacle lenses, and dual focus design contact lenses, are based on a peripheral defocus theory where hyperopic peripheral defocus can lead to myopic growth and lenses which minimize or eliminating peripheral hyperopic defocus can prevent axial elongation. Attempts are made to change the peripheral defocus while also maintaining clear vision on the central retina. Such lenses use multifocal or non-coaxial designs to manipulate focus at the peripheral retina. Such lenses have a risk of hindering vision development for children who are undergoing the visual experience-dependent critical period of vision development for adulthood. For example, for the ortho-keratology lenses, the total higher order aberration increases after wearing the ortho-keratology lens which reduces retinal image quality.

In addition, other attempted treatments such as prior studies related to narrow bandwidth light treatments (e.g., narrow bandwidth red light or blue light) of eyes have provided highly inconsistent results, depending on the species of animal tested and methods of treatment. In addition, the long-term effectiveness of such treatments is currently speculative. For example, a modest rebound effect has been observed upon cessation of low-level red light therapy. The same is true for cessation of pharmaceutical approaches, such as the prescription atropine treatments. In addition, for narrow bandwidth light treatment, the affected retinal region will vary with fixational eye movements during the treatment.

An effective, safe, non-invasive, non-pharmacological treatment that could be used with ease in the course of daily life over many years would be of benefit to millions of people. In particular, there is a need for non-invasive methods to promote emmetropization and prevent or slow the development of myopia, for example, in the developing eyes of children, and with such methods rendering use of a peripheral defocus mechanism as merely optional.

SUMMARY

The present disclosure is directed to contact lenses configured to prevent or slow development of myopia.

In some embodiments, a contact lens for slowing the progression of myopia includes a circular first zone extending from an optical center of the contact lens to a first boundary. The first zone has a first visible light transmission profile. The contact lens includes an annular second zone abutting the first zone at the first boundary. The annular second zone at least partially surrounds the first zone and extends from the first boundary to a second boundary. The second zone has the same dioptric power as a dioptric power of the first zone. The second zone has a second visible light transmission profile that is different than the first transmission profile and is a light transmission profile of about 380 nm to about 500 nm.

In some embodiments, a contact lens for slowing the progression of myopia includes a circular first zone having a diameter of about 2 mm to about 5 mm. The first zone extending from an optical center of the contact lens to a first boundary. The first zone has a first visible light transmission profile. The contact lens includes an annular second zone abutting the first zone at the first boundary. The annular second zone at least partially surrounds the first zone and extends from the first boundary to a second boundary. The second zone has a second visible light transmission profile that is different than the first transmission profile and is a blue light transmission profile. The second zone has a diameter of greater than 2 mm to about 8 mm.

BRIEF DESCRIPTIONS OF THE DRAWINGS

DETAILED DESCRIPTION

Figure 1:
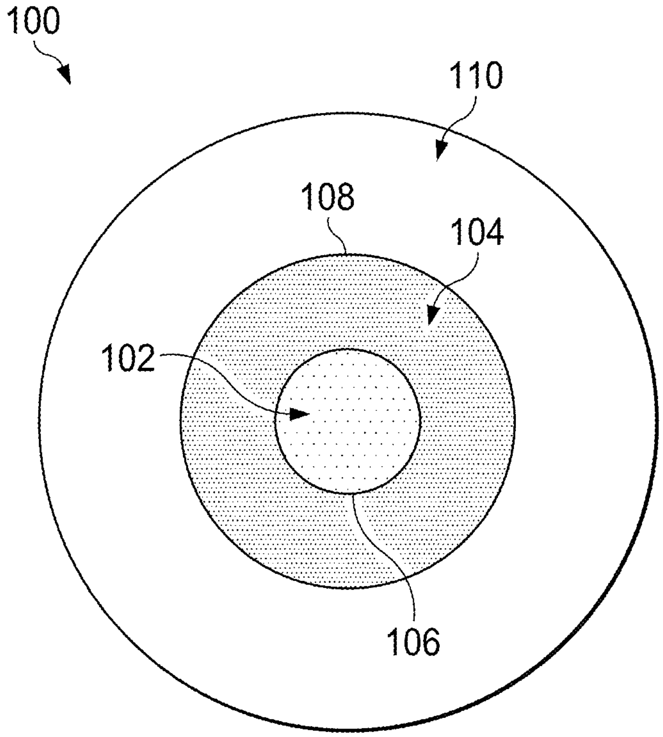
FIG. 1 is a schematic illustration of a contact lens, according to some embodiments.

The present disclosure is directed to contact lenses configured to prevent or slow myopia, for example, in children. Contact lenses of the present disclosure have a first (inner) zone optionally having a first colorant configured to substantially prevent transmittance of blue wavelength light while substantially permitting transmittance of red (and optionally green) wavelength light. The first (inner) zone can be a high contrast zone where optical performance is tailored for single vision (diffraction limited). Contact lenses of the present disclosure further have a second (peripheral) zone(s) having a second colorant that is configured to substantially permit transmittance of blue wavelength light while substantially preventing transmittance of red (and optionally green) wavelength light. The second (peripheral) zone is a reduced contrast zone where a clinically significant reduction in contrast compared to the contrast of the first zone is provided (reduction from ideal diffraction limit of the first zone). In doing so, in combination with the relative size of the first zone to the second zone, the overall contrast of the blue light can be significantly reduced with little or no reduction in contrast for red (and optionally green) light.

Without being bound by theory, light is detected by the eye because it is absorbed by the photopigments of the cones, the sensory cells in the retina. There are two types of cones in most mammals, the short-wavelength sensitive (SWS) cones that preferentially absorb and detect blue light, and the long-wavelength sensitive (LWS) cones that preferentially detect red light. Both types of cones are present across the retina. Also, most humans have a third middle-wavelength sensitive (MWS) cone photopigment. Middle-wavelength includes green light. The peak of the MWS absorbance is close to that of the LWS photopigment and the profile of the MWS photopigment overlaps extensively with that of the LWS cones. Dichromatic humans that, like the tree shrew, only have two photopigments, emmetropize normally. Without being bound by theory, it is believed that the peripheral retina drives myopia progression. When there are competing visual signals in the central versus the peripheral retina, experiments in chicks, marmosets, and macaques have demonstrated that peripheral signals can dominate axial ocular growth and central refractive development. If SWS cone array of the retina detects sharper images on the retina than the LWS system, post-receptor retinal circuitry then signals for increased axial growth (a positive drive). The imbalance between SWS and LWS image statistics directs eye growth toward the point at which this image contrast is in balance. Therefore, a contact lens allowing a large amount of reduced contrast blue light toward the periphery of the retina (as compared to a central zone having an axis at the center of the retina and/or as compared to red light toward the periphery of the retina) can provide an imbalance of SWS to LWS image statistics such that the eye growth is directed toward a maintained or decreased axial growth (a negative drive). Preferentially reducing the blue contrast can also provide superior visual quality versus reduction in contrast overall.

Such contact lenses of the present disclosure provide distinct advantages over contact lenses having a large plurality of peripheral zones providing dual focus lenses. Unlike prior contact lenses, use of a myopic defocus mechanism (dual focus) for lenses of the present disclosure is not required and has been rendered merely optional. In addition, lenses of the present disclosure that are dual focus can have zones having a larger dioptric power difference without adversely affecting vision quality (e.g., central zone of 0 dioptric power and peripheral zone of >3) while still providing anti-myopiagenic benefits, unlike prior anti-myopiagenic dual focus contact lenses.

In addition, not only can contact lenses of the present disclosure maintain blue light protection to the wearer at the center of the cornea and/or retina as provided by most commonly worn contact lenses in the market, but the blue light permitted at the periphery of the contact lens (relative to the red light permitted toward the periphery of the contact lens) provides off-axis, anti-myopiagenic benefits to the wearer. For example, anti-myopiagenic benefits can include slowing or preventing axial growth of an eye of children and young adults. In addition, unlike narrow bandwidth light treatments, contact lenses can be worn during everyday life and anti-myopia treatment occurs during this time. Such continuous treatment by allowing blue light at the retinal periphery also negates the fixational eye movement restraints of narrow bandwidth light treatments.

The emmetropization mechanism evolved and normally operates in broadband ("white") light where all wavelengths are present across the visible spectrum (400-700 nm). In broadband light, many cues are present in a defocused image that potentially can provide the drive that generates retinal signals used to modulate axial elongation. For example, in a defocused eye, image contrast on the retina is reduced. The retinal image produced by a sharp light-dark edge becomes a more gradual change from higher to lower illuminance across the retina. Other cues, such as high spatial frequencies, higher order-aberrations (astigmatism, coma, etc.) and other possible cues are also altered. The specific optical cues used by the emmetropization mechanism share the basic premise that the retina doesn't specifically detect "defocus"; rather it detects changes in the "image statistics" (such as image contrast) across the retinal surface that are produced by defocus.

Embodiments of lenses of the present disclosure (multifocal dual focus lenses) that utilize a defocus mechanism (in addition to an off-axis blue light mechanism) can be beneficial. Contact lenses of the present disclosure provide reduced contrast blue light at the retinal periphery relative to the red and green light permitted toward the periphery of the retina. It is believed such embodiments may be interpreted by the retina as the eye having too long of an axial length and the eye should stop growing (anti-myopiagenic). Accordingly, use of the above mentioned defocus mechanism is merely optional.

In some embodiments, as referenced herein, the shorter wavelength (blue light) is somewhere in the range of green to blue. In further embodiments, the shorter wavelength is 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, up to any of the foregoing values, or a range between any two of the foregoing values. In further embodiments, the longer wavelength (red light) is somewhere in the range of green to red. In further embodiments, the longer wavelength is 560 nm, 570 nm, 580 nm, 590 nm, 600 nm, 610 nm, 630 nm, 640 nm, 650 nm, 660 nm, 670 nm, 680 nm, 690 nm, 700 nm, 710 nm, 720 nm, 730 nm, 740 nm, at least any of the foregoing values, or a range between any two of the foregoing values.

Contact Lenses

Contact lenses (before including colorants thereon or therein) of the present disclosure can be obtained commercially. Alternatively, contact lenses (before or while including colorants thereon or therein) can be obtained via any suitable production method (e.g., as described further below).

The second zone(s) (peripheral to the first central zone) may include a colorant to absorb relatively less visible light than the first zone below a spectral cutoff wavelength but absorb relatively more of visible light than the first zone above the cutoff wavelength. In some embodiments, the spectral cutoff wavelength is a wavelength of or between about 420 nm to about 560 nm, such as of or between about 500 nm to about 560 nm, alternatively about 450 nm to about 500 nm, alternatively about 380 nm to about 500 nm.

One or more additional peripheral zones may be disposed substantially around the first zone and second zone. For example, a third zone may be disposed substantially around the second zone and abut the second zone. The third zone may include a colorant to absorb relatively less visible light than the first zone below a spectral cutoff wavelength but absorb relatively more of visible light than the first zone above the cutoff wavelength. In some embodiments, the spectral cutoff wavelength of the third zone is a wavelength of or between about 420 nm to about 560 nm, such as of or between about 500 nm to about 560 nm, alternatively about 450 nm to about 500 nm, alternatively about 380 nm to about 500 nm.

FIG. 1 is a schematic illustration of a contact lens 100. Contact lens 100 includes a first (inner/central) zone 102 and a second (peripheral) zone 104 disposed around and abutting first zone 102. First zone 102 has a colorant configured to prevent transmittance of blue light but permit transmittance of red light and/or green light. In some embodiments, first zone 102 is substantially or completely free of a colorant. Second zone 104 has a colorant configured to permit transmittance of blue light and prevent transmittance of red light and/or green light. First zone 102 and second 104 are separated by a first boundary 106. A second boundary 108 separates second zone 104 from a remainder portion 110 of the contact lens 100.

Figure 2:
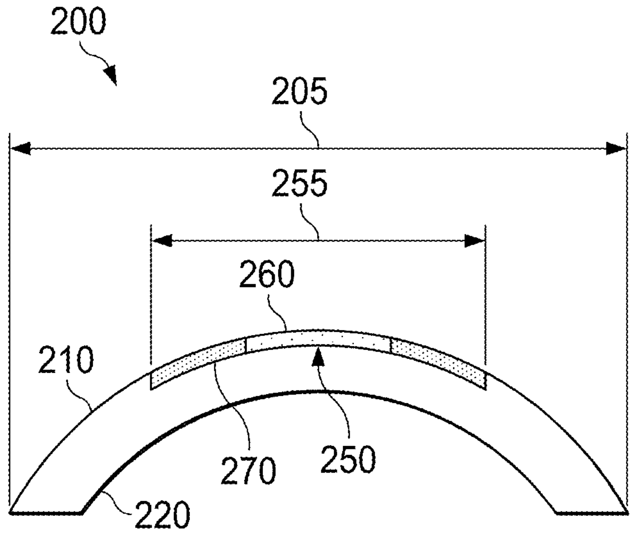
FIG. 2 is a schematic illustration of an embedded hydrogel contact lens, according to some embodiments.

FIG. 2 schematically illustrates a cross-sectional view of an embedded hydrogel contact lens according to an embodiment. An embedded hydrogel contact lens 200 comprises an anterior surface 210, an opposite posterior surface 220, and an insert 250 and has a diameter 205 sufficiently large to cover the cornea of a human eye. The insert 250 is made of a polymeric material different from the polymeric material of the remaining part of the embedded hydrogel contact lens 200 and comprises a front surface 260 and an opposite back surface 270. For example, the insert 250 is the second zone 104 of lens 100 of FIG. 1. The insert 250 has a diameter 255 sufficiently large such that a hole located in the insert 250 (e.g., first zone 102 of lens 100 of FIG. 1) is sufficiently small so to be located within the optical zone of the embedded hydrogel contact lens 200. According to such embodiments, the front surface 260 of the insert 250 substantially merges with the anterior surface 210 of the embedded hydrogel contact lens 200 (excluding any coating on the embedded hydrogel contact lens 200). The back surface 270 of the insert 250 comprises a diffractive structure (not shown).

Figure 3:
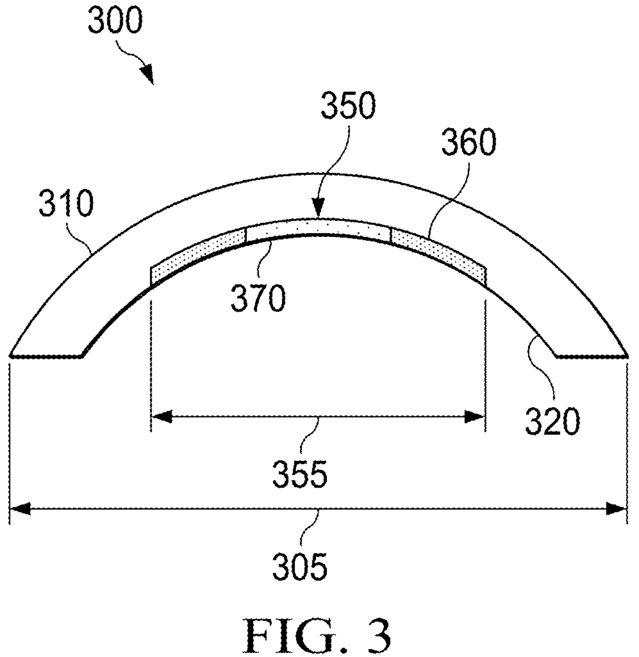
FIG. 3 is a schematic illustration of an embedded hydrogel contact lens, according to some embodiments.

FIG. 3 schematically illustrates a cross-sectional view of an embedded hydrogel contact lens according to another embodiment. An embedded hydrogel contact lens 300 comprises an anterior surface 310, an opposite posterior surface 320, and an insert 350 and has a diameter 305 sufficiently large to cover the cornea of a human eye. The insert 350 is made of a polymeric material different from the polymeric material of the remaining part of the embedded hydrogel contact lens 300 and comprises a front surface 360 and an opposite back surface 370. For example, the insert 350 is the second zone 104 of lens 100 of FIG. 1. The insert 350 has a diameter 355 sufficiently large such that a hole located in the insert 350 (e.g., first zone 102 of lens 100 of FIG. 1) is sufficiently small so to be located within the optical zone of the embedded hydrogel contact lens 300. According to such embodiments, the back surface 370 of the insert 350 substantially merges with the posterior surface 320 of the embedded contact lens 300 (excluding any coating on the embedded hydrogel contact lens 300). The front surface 360 of the insert 350 comprises a diffractive structure (not shown).

First (Central) Zone

The first (central/inner) zone may allow through, or transmit, light with a wavelength of 500 nm to 750 nm, such as about 550 nm to about 700 nm, such as about 550 nm to about 680 nm. The first (central) zone can have a diameter of about 2 mm to about 5 mm, such as about 2 mm to about 3 mm, alternatively about 3 mm to about 4 mm, alternatively about 4 mm to about 5 mm. The first (central) zone can have a % transmittance (% T) in the wavelength range of, for example, 500 nm to 700 nm of about 80% to about 100%, such as about 90% to about 100%, such as about 90% to about 95%. The first (central) zone can have a % transmittance (% T) in the wavelength range of, for example, 400 nm to 500 nm of about 20% to about 100%, such as about 40% to about 80%, such as about 40% to about 70%.

The first (central) zone may include one or more colorants. One or more of the colorants may be a dye. One or more of the colorants may be a pigment. One or more of the colorants may be a polymerizable dye. One or more of the colorants may be an anthraquinone dye (e.g., Disperse Red 9 (1-(methylamino)anthraquinone)), indolium dye (e.g., Reactive Red, such as 3H-Indolium,2-[(1E,3E)-3-(1-methyl-3,3-dimethyl-2H-indol-2-ylidene)-1-propen-1-yl]-3,3-dimethyl-1-[2-[(2-methyl-1-oxo-2-propen-1-yl)oxy]ethyl]-Bis(oxalate)borate), or triazine dye (e.g., Reactive Yellow 86, disodium; 4-[(5-carbamoyl-1-ethyl-6-hydroxy-4-methyl-2-oxopyridin-3-yl)diazenyl]-6-[(4,6-dichloro-1,3,5-triazin-2-yl)amino]benzene-1,3-disulfonate). One or more of the colorants may be configured to filter out light at an absorption maximum wavelength of about 100 nm to about 500 nm, such as about 100 nm to about 450 nm, such as about 100 nm to about 400 nm, alternatively about 400 nm to about 495 nm, such as about 400 nm to about 450 nm, alternatively about 450 nm to about 495 nm. A combination of two or more colorants may be configured to filter out light at an absorption maximum wavelength of about 100 nm to about 500 nm, such as about 100 nm to about 450 nm, such as about 100 nm to about 400 nm, alternatively about 400 nm to about 495 nm, such as about 400 nm to about 450 nm, alternatively about 450 nm to about 495 nm.

The first (central) zone may include one or more compounds in addition to the colorant(s). One or more of the compounds may be configured to filter UV light. For example, one or more of the compounds may absorb light at an absorption maximum wavelength of about 100 nm to about 500 nm, such as about 100 nm to about 450 nm, such as about 100 nm to about 400 nm, alternatively about 400 nm to about 495 nm, such as about 400 nm to about 450 nm, alternatively about 450 nm to about 495 nm. A combination of two or more compounds may be configured to filter light at an absorption maximum wavelength of about 100 nm to about 500 nm, such as about 100 nm to about 450 nm, such as about 100 nm to about 400 nm, alternatively about 400 nm to about 495 nm, such as about 400 nm to about 450 nm, alternatively about 450 nm to about 495 nm. The first (central) zone may include at least one compound that absorbs UV-light. The skilled person will be aware of suitable UV blocking compounds. The UV-blocking compound may be colorless.

The first (central) zone may include a material having one or more colorants dispersed within it. The first (central) zone may include a material having one or more colorants and one or more compounds dispersed within it. The first (central) zone may include a polymeric material. The first (central)

zone may include a polymeric material having one or more colorants dispersed within it. The first (central) zone may include a polymeric material having one or more colorants and one or more compounds dispersed within it. One or more of the colorants may be a polymerizable dye. The first (central) zone may include a polymeric matrix formed from one or more monomers and one or more colorants.

In some embodiments, the first (central) zone (in dried state) includes about 1% to about 3.5%, such as about 1.5% to about 2.7%, such as about 2% to about 2.5% by weight of the colorant of the first (central) zone. In some embodiments, the overall contact lens (in dried state) includes about 1% to about 3.5%, such as about 1.5% to about 2.7%, such as about 2% to about 2.5% by weight of the colorant of the overall contact lens. It is understood that weight percentages of colorant in the contact lens material is determined based on the colorant(s)' weight percentages in first zone or the overall contact lens, relative to total weight of the first zone or the overall contact lens, where applicable.

The first (central) zone may include a first colorant with an absorption maximum wavelength of, for example, about 450 nm to about 495 nm and a second colorant with an absorption maximum wavelength of, for example, about 450 nm to about 495 nm. The first colorant may have a different absorption maximum wavelength compared to the second colorant.

As used herein, the term "absorption maximum wavelength" refers to the wavelength at which the colorant has the highest absorbance as measured by UV-visible spectroscopy. This is also known as the characteristic wavelength of the colorant.

Second (Peripheral) Zone

The second (peripheral) zone may allow through, or transmit, light with a wavelength of about 100 nm to about 500 nm, such as about 350 nm to about 500 nm, such as about 400 nm to about 500 nm, such as about 400 nm to about 450 nm, alternatively about 450 nm to about 495 nm, such as about 450 nm to about 480 nm. The second (peripheral) zone can have a diameter of greater than 2 mm to about 10 mm, such as about 2.1 mm to about 3 mm, alternatively about 3 mm to about 4 mm, alternatively about 4 mm to about 5 mm, alternatively about 5 mm to about 6 mm, alternatively about 6 mm to about 7 mm, alternatively about 7 mm to about 8 mm, alternatively about 8 mm to about 9 mm, alternatively about 9 mm to about 10 mm. The diameter of the second zone is determined as the distance from a first point on the second boundary (e.g., second boundary 108) to another point on the second boundary that is directly opposite the first point. The second (peripheral) zone can have a % transmittance (% T) in the wavelength range of 400 nm to 500 nm of about 70% to about 100%, such as about 90% to about 100%, such as about 90% to about 95%. The second (peripheral) zone can have a % transmittance (% T) in the wavelength range of 500 nm to 700 nm of about 0% to about 30%, such as about 1% to about 25%, such as about 5% to about 25%, alternatively about 20% to about 30%.

The second (peripheral) zone may include one or more colorants. One or more of the colorants may be a dye. One or more of the colorants may be a pigment. One or more of the colorants may be a polymerizable dye. One or more of the colorants may be an anthraquinone dye (e.g., Reactive Blue 247 (2-[[4-[2-(2-methylprop-2-enoyloxy)ethylamino]-9,10-dioxoanthracen-1-yl]amino]ethyl 2-methylprop-2-enoate)) or Reactive Blue 246 (2-[4-[[4-[4-[2-(2-methylprop-2-enoyloxy)ethyl]anilino]-9,10-dioxoanthracen-1-yl]amino]phenyl]ethyl 2-methylprop-2-enoate)), a phthalocyanine dye (e.g., Cu(II)-phthalocyanine), or indolium dye (e.g., Reactive Red, such as 3H-Indolium,2-[(1E,3E)-3-(1-methyl-3,3-dimethyl-2H-indol-2-ylidene)-1-propen-1-yl]-3,3-dimethyl-1-[2-[(2-methyl-1-oxo-2-propen-1-yl)oxy]ethyl]-Bis(oxalate)borate). One or more of the colorants may be configured to filter light with an absorption maximum wavelength in the range of 500 nm to 750 nm, such as about 500 nm to about 700 nm, such as about 550 nm to about 700 nm. A combination of two or more colorants may be configured to filter light with an absorption maximum wavelength in the range of 500 nm to 750 nm. A combination of two or more colorants may be configured to filter light with an absorption maximum wavelength of about 500 nm to 750 nm.

The second (peripheral) zone may include one or more compounds in addition to the colorant(s). One or more of the compounds may be configured to filter infrared (IR) light. One or more of the compounds may additionally or alternatively absorb light at an absorption maximum wavelength in the range of 500 nm to 750 nm, such as about 500 nm to about 700 nm, such as about 550 nm to about 700 nm. The second (peripheral) zone may include at least one compound that absorbs IR-light. The skilled person will be aware of suitable IR blocking compounds. The IR-blocking compound may be colorless.

The second (peripheral) zone may include a material having one or more colorants dispersed within it. The second (peripheral) zone may include a material having one or more colorants and one or more compounds dispersed within it. The second (peripheral) zone may include a polymeric material that is the same as or different than the polymeric material of the first (central) zone. The second (peripheral) zone may include a polymeric material having one or more colorants dispersed within it. The second (peripheral) zone may include a polymeric material having one or more colorants and one or more compounds dispersed within it. One or more of the colorants may be a polymerizable dye. The contact lens may include a polymeric matrix formed from one or more monomers and one or more colorants.

In some embodiments, the second (peripheral) zone (in dried state) includes about 1% to about 3.5%, such as about 1.5% to about 2.7%, such as about 2% to about 2.5% by weight of the colorant of the second (peripheral) zone. In some embodiments, the overall contact lens (in dried state) includes about 1% to about 3.5%, such as about 1.5% to about 2.7%, such as about 2% to about 2.5% by weight of the colorant of the overall contact lens. It is understood that weight percentages of colorant in the contact lens material is determined based on the colorant(s)' weight percentages in second zone or the overall contact lens, relative to total weight of the second zone or the overall contact lens, where applicable.

The second (peripheral) zone may include a first colorant with an absorption maximum wavelength about 500 nm to about 750 nm and a second colorant with an absorption maximum wavelength of about 500 nm to about 750 nm. The first colorant may have a different absorption maximum wavelength compared to the second colorant.

The second (peripheral) zone can have the same (monofocal) or different (dual focus) dioptric power as the first (central) zone. For example, the first (central) zone can have a dioptric power of −10 diopters (D) to about +2 D, such as about −2 D to about +2 D, such as about 0, which can provide power correction independent of myopia control. The second (peripheral) zone can be a single plus power or a relative power varying from the power of the first zone. In some embodiments, the second (peripheral) zone can have a dioptric power (single power or relative power) of about +1 D to about +10 D, such as about +1 D to about +6 D, such as about +1 D to about +3 D, alternatively about +2 D to about +3 D. Alternatively, the first (central) zone can have a dioptric power of −2 to +2, such as 0, and the second (peripheral) zone can have a dioptric power (single power or relative) of −1 to −10, such as −1 to −5, such as −1 to −2, alternatively −5 to −10, such as −7 to −9. Alternatively, the second (peripheral) zone optionally has the same dioptric power as the first (central) zone, and the second (peripheral) zone is configured to provide scattering of incident light. For example, an upper or lower surface of the second (peripheral) zone has a high frequency scattering pattern or the second (peripheral) zone has a plurality of scattering centers sized and shaped to scatter incident light.

Contact Lens Base Material

In general, a contact lens can be a silicone hydrogel (SiHy) contact lens. A silicone hydrogel contact lens can include an anterior (convex) surface and an opposite posterior (concave) surface (that rests on the cornea of the eye of a user).

A contact lens may optionally include a structural configuration from the anterior surface to the posterior surface, where the structural configuration includes a silicone hydrogel bulk material and an insert.

In accordance with some embodiments, a lens is formed with a lens-forming composition. The lens-forming composition can be a hydrogel lens-forming composition, such as a silicone hydrogel (SiHy) lens-forming composition.

In some embodiments, the lens-forming composition is a non-silicone hydrogel lens-forming composition (or non-silicone hydrogel lens formulation) which comprises (a) at least one hydrophilic vinylic monomer (e.g., hydroxyl-containing vinylic monomer, N-vinylpyrrolidone, N-vinyl-N-methyl acetamide, 1-methyl-3-methylene-2-pyrrolidone, or combinations thereof), and (b) at least one component selected from a hydrophobic vinylic monomer, a UV-absorbing vinylic monomer, a visibility tinting agent, and combinations thereof.

For example, a non-silicone hydrogel lens-forming composition comprises at least 50% by mole of at least one hydroxyl-containing vinylic monomer, for example, selected from hydroxyethyl (meth)acrylate, glycerol (meth) acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, such as selected from hydroxyethyl (meth)acrylate, glycerol (meth)acrylate, and vinyl alcohol.

In some embodiments, a lens-forming composition is a SiHy lens-forming composition (i.e., a SiHy lens formulation). For example, a SiHy lens-forming composition comprises (a) at least one silicone-containing vinylic monomer and/or at least one polysiloxane vinylic crosslinker, (b) at least one hydrophilic vinylic monomer, and (c) at least one component selected from a UV-absorbing vinylic monomer, a visibility tinting agent, and combinations thereof.

Any suitable free-radical initiators (thermal initiators or photoinitiators) known to a person skilled in the art can be used to polymerize monomers of the present disclosure.

In some embodiments, a silicone-containing (or siloxane-containing) vinylic monomer can be any silicone-containing vinylic monomer known to a person skilled in the art. Examples of silicone-containing vinylic monomers include vinylic monomers each having a bis(trialkylsilyloxy)alkylsilyl group (such as a bis(trimethylsilyloxy)-alkylsilyl group) or a tris(trialkylsilyloxy)silyl group (such as a tris(trimethylsilyloxy)silyl group), polysiloxane vinylic monomers, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of siloxane-containing vinylic monomers each having a bis(trialkylsilyloxy)alkylsilyl group or a tris(trialkylsilyloxy)silyl group include tris(trimethylsilyloxy)-silylpropyl (meth)acrylate, [3-(meth)acryloxy-2-hydroxypropyloxy]propyl-bis(trimethylsiloxy)-methylsilane, [3-(meth)acryloxy-2-hydroxypropyloxy]propylbis(trimethyl-siloxy) butylsilane, 3-(meth)acryloxy-2-(2-hydroxyethoxy)-propyloxy)propyl-bis(trimethylsiloxy)-methylsilane, 3-(meth)acryloxy-2-hydroxypropyloxy)propyltris(trimethylsiloxy) silane, N-[tris(trimethylsiloxy)silylpropyl]-(meth) acrylamide, N-(2-hydroxy-3-(3-(bis(trimethylsilyloxy)-methylsilyl)propyloxy)-propyl)-2-methyl (meth) acrylamide, N-(2-hydroxy-3-(3-(bis(trimethyl-silyloxy) methylsilyl)propyloxy)propyl)(meth)acrylamide, N-(2-hydroxy-3-(3-(tris(trimethyl-silyloxy)silyl)propyloxy)-propyl)-2-methyl acrylamide, N-(2-hydroxy-3-(3-(tris (trimethylsilyloxy)-silyl)propyloxy)propyl)(meth) acrylamide, N-[tris(dimethylpropylsiloxy)-silylpropyl]-(meth)acrylamide, N-[tris(dimethylphenylsiloxy) silylpropyl](meth)acrylamide, N-[tris(dimethyl-ethylsiloxy) silylpropyl](meth)acrylamide, N,N-bis[2-hydroxy-3-(3-(bis (trimethylsilyloxy)-methylsilyl)propyloxy)propyl]-2-methyl (meth)acrylamide, N,N-bis[2-hydroxy-3-(3-(bis (trimethyl-silyloxy)methylsilyl)propyloxy)-propyl](meth) acrylamide, N,N-bis[2-hydroxy-3-(3-(tris(trimethyl-silyloxy)silyl)propyloxy)propyl]-2-methyl (meth) acrylamide, N,N-bis[2-hydroxy-3-(3-(tris(trimethyl-silyloxy)silyl)propyloxy)propyl](meth)acrylamide, N-[2-hydroxy-3-(3-(t-butyldimethylsilyl)-propyloxy)propyl]-2-methyl (meth)acrylamide, N-[2-hydroxy-3-(3-(t-butyldimethylsilyl)propyloxy)-propyl](meth)acrylamide, N,N-bis[2-hydroxy-3-(3-(t-butyldimethylsilyl)propyloxy) propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris (trimethylsiloxy)silyl]propyl vinyl carbonate, those disclosed in U.S. Pat. Nos. 9,097,840, 9,103,965 and 9,475,827 (herein incorporated by references in their entireties), and mixtures thereof. The above example silicone-containing vinylic monomers can be obtained from commercial suppliers or can be prepared according to procedures described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827.

Examples of polysiloxane vinylic monomers include mono-(meth)acryloyl-terminated, monoalkyl-terminated polysiloxanes include α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth) acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxy-ethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α-[(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylamino-propyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamido-propyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamido-butyloxy-2-hydroxypropyloxypropyl]-terminated ω-butyl (or ω-methyl) terminated polydimethylsiloxane, α-[3-(meth)acryloylamido-2-hydroxypropyloxypropyl]terminated ω-butyl (or ω-methyl) polydimethylsiloxane, α-[3-[N-methyl-(meth)acryloylamido]-2-hydroxypropyloxy-propyl]terminated ω-butyl (or ω-methyl) terminated polydimethylsiloxane, N-methyl-N'-(propyl-tetra(dimethylsiloxy)dimethylbutylsilane)(meth)acrylamide, N-(2,3-dihydroxypropane)-N'-(propyltetra(dimethylsiloxy)dimethylbutylsilane)(meth)acrylamide, (meth)acryloylamido-propyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above example polysiloxanes vinylic monomers can be obtained from commercial suppliers (e.g., Shin-Etsu, Gelest, etc.) or prepared according to procedures described in patents, e.g., U.S. Pat. Appl. Pub. Nos. 6166236, 6867245, 8415405, 8475529, 8614261, 9217813, and 9315669, or by reacting a hydroxyalkyl (meth)acrylate or (meth)acrylamide or a (meth)acryloxy-polyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth) acrylate with a mono-carbinol-terminated polydimethylsiloxane according to coupling reactions well known to a person skilled in the art.

In some embodiments, any polysiloxane vinylic crosslinkers can be used. Examples of polysiloxane vinylic crosslinkers include α,ω-(meth)acryloxy-terminated polydimethylsiloxanes of various molecular weight; α,ω-(meth) acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with diamino-terminated polysiloxanes; the reaction products of glycidyl methacrylate with dihydroxyl-terminated polysiloxanes; the reaction products of an azlactone-containing vinylic monomer (any one of those described above) with di-hydroxyl-terminated polydimethylsiloxanes; the reaction products of isocyanatoethyl (meth) acrylate with di-hydroxyl-terminated polydimethylsiloxanes; the reaction products of isocyanatoethyl (meth) acrylate with diamino-terminated polydimethylsiloxanes; polysiloxane-containing macromer selected from Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of polysiloxane vinylic crosslinkers are vinylic crosslinkers which are prepared by: reacting glycidyl (meth) acrylate or (meth)acryloyl chloride with a di-amino-terminated polydimethylsiloxane or a di-hydroxyl-terminated polydimethylsiloxane; reacting isocyanatoethyl (meth)acrylate with di-hydroxyl-terminated polydimethylsiloxanes; reacting an amino-containing acrylic monomer with di-carboxyl-terminated polydimethylsiloxane in the presence of a coupling agent (a carbodiimide); reacting a carboxyl-containing acrylic monomer with di-amino-terminated polydimethylsiloxane in the presence of a coupling agent (a carbodiimide); or reacting a hydroxyl-containing acrylic monomer with a di-hydroxy-terminated polydisiloxane in the presence of a diisocyanate or di-epoxy coupling agent.

Examples of such polysiloxane vinylic crosslinkers are α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth) acryloxypropyloxy-2-hydroxypropyloxypropyl]-terminated polydimethylsiloxane, α,ω-bis[3-(meth)acryloxy-isopropyloxy-2-hydroxypropyloxy-propyl]-terminated polydimethylsiloxane, α,ω-bis[3-(meth)acryloxybutyloxy-2-hydroxypropyloxy-propyl]-terminated polydimethylsiloxane, α,ω-bis[3-(meth)acrylamidoethoxy-2-hydroxypropyloxy-propyl]-terminated polydimethylsiloxane, α,ω-bis[3-(meth) acrylamidopropyloxy-2-hydroxy-propyloxypropyl]-terminated polydimethylsiloxane, α,ω-bis[3-(meth) acrylamidoisopropyloxy-2-hydroxypropyloxypropyl]-terminated polydimethylsiloxane, α,ω-bis[3-(meth) acrylamidobutyloxy-2-hydroxypropyloxypropyl]-terminated polydimethylsiloxane, α,ω-bis[3-(meth) acryloxyethyl-amino-2-hydroxypropyloxypropyl]- terminated polydimethylsiloxane, α,ω-bis[3-(meth)acryloxy-propylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxy-propyl-N-ethylaminopropyl]-terminated polydimethylsiloxane, α,ω-bis[(meth)acryloxy-2-hydroxypropyl-amino-propyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, and combinations thereof.

Another class of polysiloxane vinylic crosslinkers are chain-extended polysiloxane vinylic crosslinkers each of which comprises at least two polysiloxane segments and can be prepared according to the procedures described in U.S. Pat. Nos. 5,034,461, 5,416,132, 5,449,729, 5,760,100, 7,423,074, 8,529,057, 8,835,525, 8,993,651, and 10301451 and in U.S. Pat. App. Pub. No. 2018-0100038 A1.

A further class of polysiloxane vinylic crosslinkers are hydrophilized polysiloxane vinylic crosslinkers that each comprise at least about 1.50 (such as at least about 2.0, such as at least about 2.5, such as at least about 3.0) milliequivalent/gram ("meq/g") of hydrophilic moieties, which can be hydroxyl groups (—OH), carboxyl groups (—COOH), amino groups (—$NHR_{N1}$ in which $R_{N1}$ is H or $C_1$-$C_2$ alkyl), amide moieties (—CO—$NR_{N1}R_{N2}$ in which $R_{N1}$ is H or $C_1$-$C_2$ alkyl and $R_{N2}$ is a covalent bond, H, or $C_1$-$C_2$ alkyl), N—$C_1$-$C_3$ acylamino groups, urethane moieties (—NH—CO—O—), urea moieties (—NH—CO—NH—), a polyethylene glycol chain of $-(C_2H_4O)_N-T_1$ in which n is an integer of 2 to 20 and $T_1$ is H, methyl or acetyl or a phosphorylcholine group, or combinations thereof.

Examples of such hydrophilized polysiloxane vinylic crosslinkers are those compounds of formular (1)

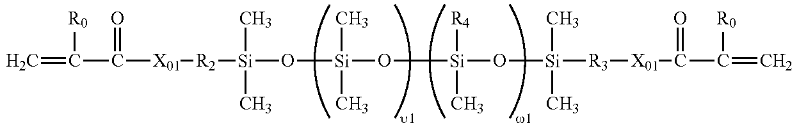

(1)

in which:

υ1 is an integer of from 30 to 500 and w1 is an integer of from 1 to 75, provided that w1/υ1 is from about 0.035 to about 0.15 (such as from about 0.040 to about 0.12, such as from about 0.045 to about 0.10);

$X_{01}$ is O or $NR_N$ in which $R_N$ is hydrogen or $C_1$-$C_{10}$-alkyl;

$R_o$ is hydrogen or methyl;

$R_2$ and $R_3$ independently of each other are a substituted or unsubstituted $C_1$-$C_{10}$ alkylene divalent radical or a divalent radical of —$R_5$—O—$R_6$— in which $R_5$ and $R_6$ independently of each other are a substituted or unsubstituted $C_1$-$C_{10}$ alkylene divalent radical;

$R_4$ is a monovalent radical of any one of formula (2) to (7)

(2)

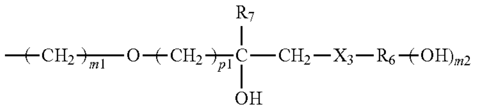

(3)

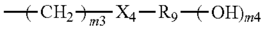

(4)

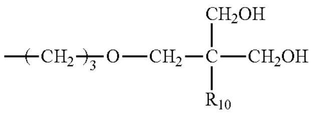

(5)

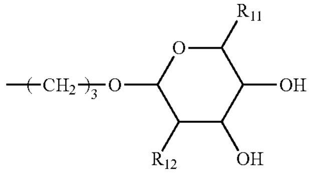

(6)

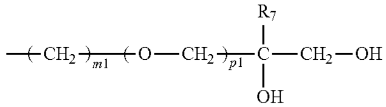

(7)

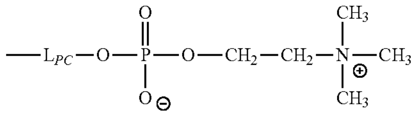

p1 is zero or 1; m1 is an integer of 2 to 4; m2 is an integer of 1 to 5; m3 is an integer of 3 to 6; m4 is an integer of 2 to 5;

$R_7$ is hydrogen or methyl;

$R_8$ is a $C_2$-$C_6$ hydrocarbon radical having (m2+1) valencies;

$R_9$ is a $C_2$-$C_6$ hydrocarbon radical having (m4+1) valencies;

$R_{10}$ is ethyl or hydroxymethyl;

$R_{11}$ is methyl or hydroxymethyl;

$R_{12}$ is hydroxyl or methoxy;

$X_3$ is a sulfur linkage of —S— or a tertiary amino linkage of —$NR_{13}$— in which $R_{13}$ is $C_1$-$C_1$ alkyl, hydroxyethyl, hydroxypropyl, or 2,3-dihydroxypropyl $X_4$ is an amide linkage of

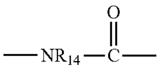

or

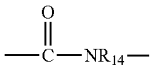

in which $R_{14}$ is hydrogen or $C_1$-$C_{10}$ alkyl;

$L_{PC}$ is a divalent radical of

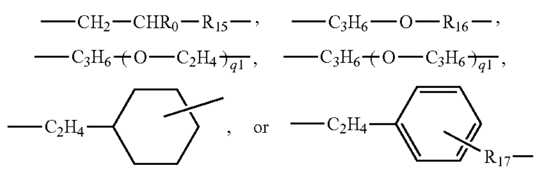

in which q1 is an integer of 1 to 20, $R_{15}$ is a linear or branched $C_1$-$C_{10}$ alkylene divalent radical, $R_{16}$ is a linear or branched $C_3$-$C_{10}$ alkylene divalent radical, and $R_{17}$ is a direct bond or a linear or branched $C_1$-$C_4$ alkylene divalent radical.

Hydrophilized polysiloxane vinylic crosslinker of formula (1) can be prepared according to the procedures disclosed in U.S. patent Ser. No. 10/081,697 and U.S. Pat. Appl. Pub. No. 2022/0251302 A1.

Any hydrophilic vinylic monomers can be used. Examples of hydrophilic vinylic monomers are alkyl (meth) acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

Examples of alkyl (meth)acrylamides include (meth)acrylamide, N,N-dimethyl (meth)acrylamide, N-ethyl (meth) acrylamide, N,N-diethyl (meth)acrylamide, N-propyl (meth) acrylamide, N-isopropyl (meth)acrylamide, N-3-methoxypropyl (meth)acrylamide, and combinations thereof.

Examples of hydroxyl-containing acrylic monomers include N-2-hydroxylethyl (meth)acrylamide, N,N-bis(hydroxyethyl)(meth)acrylamide, N-3-hydroxypropyl (meth) acrylamide, N-2-hydroxypropyl (meth)acrylamide, N-2,3-dihydroxypropyl (meth)acrylamide, N-tris(hydroxymethyl) methyl (meth)acrylamide, 2-hydroxyethyl (meth)acrylate, 3-hydroxypropyl (meth)acrylate, 2-hydroxypropyl (meth) acrylate, glycerol methacrylate (GMA), di(ethylene glycol) (meth)acrylate, tri(ethylene glycol)(meth)acrylate, tetra(ethylene glycol)(meth)acrylate, poly(ethylene glycol)(meth) acrylate having a number average molecular weight of up to 1500, poly(ethylene glycol)ethyl (meth)acrylamide having a number average molecular weight of up to 1500, and combinations thereof.

Examples of carboxyl-containing acrylic monomers include 2-(meth)acrylamidoglycolic acid, (meth)acrylic acid, ethylacrylic acid, 3-(meth)acrylamido-propionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl 3,3-dimethyl butanoic acid, 3-(meth)acrylamidohaxanoic acid, 4-(meth)acrylamido-3,3-dimethylhexanoic acid, and combinations thereof.

Examples of amino-containing acrylic monomers include N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth) acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth) acrylate, and combinations thereof.

Examples of N-vinyl amide monomers include N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

Examples of methylene-containing pyrrolidone monomers include 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and mixtures thereof.

Examples of acrylic monomers having a $C_1$-$C_4$ alkoxyethoxy group include ethylene glycol methyl ether (meth) acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol)(meth)acrylate having a number average molecular weight of up to 1500, methoxy-poly(ethylene glycol)ethyl (meth)acrylamide having a number average molecular weight of up to 1500, and combinations thereof.

Examples of vinyl ether monomers include ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of allyl ether monomers include ethylene glycol monoallyl ether, di(ethylene glycol) monoallyl ether, tri (ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra (ethylene glycol) methyl allyl ether, poly(ethylene glycol) methyl allyl ether, and combinations thereof.

Examples of phosphorylcholine-containing vinylic monomers include (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]-propyl-2'-(trimethylammonio)-ethylphosphate, 4-[(meth)acryloylamino]butyl-2'-(trimethyl-ammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethyl-phosphate, 2-((meth)acryloyloxy)ethyl-2'-(tripropylammonio)ethylphosphate, 2-((meth)acryloxy)-ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)ethyl-phosphate, 2-(vinylcarbonyl-amino)ethyl-2'-(trimethylammonio)ethylphosphate, 2-(allyloxycarbonylamino)-ethyl-2'-(trimethylammonio)ethyl phosphate, 2-(butenoyloxy)ethyl-2'-(trimethylammonio)-ethylphosphate, and combinations thereof.

In some embodiments, the SiHy lens-forming composition can also comprise one or more hydrophobic non-silicone vinylic monomers. Examples of hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, etc.), fluorine-containing acrylic monomers (e.g., perfluorohexylethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isobutyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth)acrylates can be used. Examples of perfluoro-substituted-$C_2$-$C_{12}$ alkyl (meth)acrylates include 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoro-pentyl (meth)acrylate, heptadecafluorodecyl (meth)acrylate, pentafluorophenyl (meth)acrylate, and combinations thereof.

In some embodiments, the SiHy lens-forming composition can also comprise one or more non-silicone vinylic crosslinkers (free of aryl group). Examples of non-silicone vinylic crosslinking agents include: acrylic crosslinkers (free of aryl group) as described above, allyl methacrylate, allyl acrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, 2,4,6-triallyloxy-1,3,5-triazine, 1,2,4-trivinylcyclohexane, or combinations thereof.

Examples of photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)-pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

Contact Lens Insert

A contact lens insert (e.g., insert 250 or 350) can be formed using an insert-forming composition. In accordance with some embodiments, an insert-forming composition can be any polymerizable compositions.

In various embodiments, the crosslinked polymeric material of the insert has a refractive index of at least 1.47, (such as at least 1.49, such as at least 1.51, such as at least 1.53).

In some embodiments, the insert-forming composition is a polymerizable composition for forming a silicone elastomer. Any suitable silicone elastomer formulations known to a person skilled in the art can be used.

In other various embodiments, an insert-forming composition comprises at least one aryl vinylic monomer and/or at least one aryl vinylic crosslinker. Aryl vinylic monomers and aryl vinylic crosslinkers can provide resultant insert with a relatively high refractive index.

Examples of aryl vinylic monomers include: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxy-phenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxy-propyl methacrylate; 2-[2-(benzyloxy)ethoxy]ethyl acrylate; 2-[2-(benzyloxy)ethoxy]ethyl methacrylate; silicone-containing aryl vinylic monomers (e.g., p-vinylphenyltris(trimethylsiloxy)silane, m-vinylphenyltris(trimethylsiloxy)silane, o-vinylphenyltris(trimethylsiloxy)silane, p-styrylethyltris(trimethylsiloxy)silane, m-styrylmethyl-tris (trimethylsiloxy)silane, o-styrylethyltris(trimethylsiloxy)silane); aryl-containing ene monomers; or combinations thereof. The above listed aryl acrylic monomers can be obtained from commercial sources or alternatively prepared according to methods known in the art.

Examples of aryl-containing ene monomers include vinyl naphthalenes, vinyl anthracenes, vinyl phenanthrenes, vinyl pyrenes, vinyl biphenyls, vinyl terphenyls, vinyl phenyl naphthalenes, vinyl phenyl anthracenes, vinyl phenyl phenanthrenes, vinyl phenyl pyrenes, vinyl phenyl terphenyls, phenoxy styrenes, phenyl carbonyl styrenes, phenyl carboxy styrenes, phenoxy carbonyl styrenes, allyl naphthalenes, allyl anthracenes, allyl phenanthrenes, allyl pyrenes, allyl biphenyls, allyl terphenyls, allyl phenyl naphthalenes, allyl phenyl anthracenes, allyl phenyl phenanthrenes, allyl phenyl pyrenes, allyl phenyl terphenyls, allyl phenoxy benzenes, allyl(phenylcarbonyl)benzenes, allyl phenoxy benzenes, allyl(phenyl carbonyl)benzenes, allyl(phenylcarboxy)benzenes, and allyl(phenoxy carbonyl)benzenes.

Examples of aryl-containing ene monomers include styrene, 2,5-dimethylstyrene, 2-(trifluoromethyl)styrene, 2-chlorostyrene, 3,4-dimethoxystyrene, 3-chlorostyrene, 3-bromostyrene, 3-vinylanisole, 3-methylstyrene, 4-bromostyrene, 4-tert-butylstyrene, 2,3,4,5,6-pentafluorostyrene, 2,4-dimethylstyrene, 1-methoxy-4-vinylbenzene, 1-chloro-4-vinylbenzene, 1-methyl-4-vinylbenzene, 1-(chloromethyl)-4-vinylbenzene, 1-(bromomethyl)-4-vinylbenzene, 3-nitrostyrene, 1,2-vinyl phenyl benzene, 1,3-vinyl phenyl benzene, 1,4-vinyl phenyl benzene, 4-vinyl-1,1'-(4'-phenyl) biphenylene, 1-vinyl-4-(phenyloxy)benzene, 1-vinyl-3-(phenyloxy)benzene, 1-vinyl-2-(phenyloxy)benzene, 1-vinyl-4-(phenyl carbonyl)benzene, 1-vinyl-3-(phenylcarboxy) benzene, 1-vinyl-2-(phenoxycarbonyl)benzene, allyl phenyl ether, 2-biphenylylallyl ether, allyl 4-phenoxyphenyl ether, allyl 2,4,6-tribromophenyl ether, allyl phenyl carbonate, 1-allyloxy-2-trifluoromethylbenzene, allylbenzene, 1-phenyl-2-prop-2-enylbenzene, 4-phenyl-1-butene, 4-phenyl-1-butene-4-ol, 1-(4-methylphenyl)-3-buten-1-ol, 1-(4-chlorophenyl)-3-buten-1-ol, 4-allyltoluene, 1-allyl-4-fluorobenzene, 1-allyl-2-methylbenzene, 1-allyl-3-methylbenzene, 1-allyl-3-methylbenzene, 2-allylanisole, 4-allylanisole, 1-allyl-4-(trifluromethyl)benzene, allylpentafluorobenzene, 1-allyl-2-methoxybenzene, 4-allyl-1,2-dimethoxybenzene, 2-allylphenol, 2-allyl-6-methylphenol, 4-allyl-2-methoxyphenol, 2-allyloxyanisole, 4-allyl-2-methoxyphenyl acetate, 2-allyl-6-methoxyphenol, 1-allyl-2-bromobenzene, alpha-vinylbenzyl alcohol, 1-phenyl-3-butene-1-one, allylbenzyl ether, (3-allyloxy)propyl) benzene, allyl phenylethyl ether, 1-benzyloxy-4-pentene, (1-allyloxy)ethyl)benzene, 1-phenylallyl ethyl ether, (2-methyl-2-(2-propenyloxy)propyl)benzene, ((5-hexenyloxy)methyl)benzene, 1-allyloxy-4-propoxybenzene, 1-phenoxy-4-(3-prop-2-epoxypropoxy)benzene, 6-(4'-Hydroxyphenoxy)-1-Hexene, 4-but-3-enoxyphenol, 1-allyloxy-4-butoxybenzene, 1-allyloxy-4-ethoxybenzene, 1-allyl-4-benzyloxybenzene, 1-allyl-4-(phenoxy)benzene, 1-allyl-3-(phenoxy)benzene, 1-allyl-2-(phenoxy)benzene, 1-allyl-4-(phenyl carbonyl)benzene, 1-allyl-3-(phenyl carboxy) benzene, 1-allyl-2-(phenoxycarbonyl)benzene, 1,2-allyl phenyl benzene, 1,3-allyl phenyl benzene, 1,4-allyl phenyl benzene, 4-vinyl-1,1'-(4'-phenyl)biphenylene, 1-allyl-4-(phenyloxy)benzene, 1-allyl-3-(phenyloxy)benzene, 1-allyl-2-(phenyloxy)benzene, 1-allyl-4-(phenyl carbonyl)benzene, 1-allyl-3-(phenyl carboxy)benzene, and 1-allyl-2-(phenoxycarbonyl)benzene, 1-vinyl naphthylene, 2-vinyl naphthylene, 1-allyl naphthalene, 2-allyl naphthalene, allyl-2-naphthyl ether, 2-(2-methylprop-2-enyl)naphthalene, 2-prop-2-enylnaphthalene, 4-(2-naphthyl)-1-butene, 1-(3-butenyl) naphthalene, 1-allyl naphthalene, 2-allyl naphthalene, 1-allyl-4-napthyl naphthalene, 2-(allyloxy)-1-bromonaphthalene, 2-bromo-6-allyloxynaphthalene, 1,2-vinyl(1-naphthyl)benzene, 1,2-vinyl(2-naphthyl)benzene, 1,3-vinyl(1-naphthyl)benzene, 1,3-vinyl(2-naphthyl)benzene, 1,4-vinyl (1-naphthyl)benzene, 1,4-vinyl(2-naphthyl)benzene, 1-naphthyl-4-vinyl naphthalene, 1-allyl naphthalene, 2-allyl naphthalene, 1,2-allyl(1-naphthyl) benzene, 1,2-allyl(2-naphthyl)benzene, 1,3-allyl(1-naphthyl)benzene, 1,3-allyl (2-naphthyl)benzene, 1,4-allyl(1-naphthyl)benzene, 1,4-allyl(2-naphthyl)benzene, 1-allyl-4-napthyl naphthalene, 1-vinyl anthracene, 2-vinyl anthracene, 9-vinyl anthracene, 1-allyl anthracene, 2-allyl anthracene, 9-allyl anthracene, 9-pent-4-enylanthracene, 9-allyl-1,2,3,4-tetrachloroanthracene, 1-vinyl phenanthrene, 2-vinyl phenanthrene, 3-vinyl phenanthrene, 4-vinyl phenanthrene, 9-vinyl phenanthrene, 1-allyl phenanthrene, 2-allyl phenanthrene, 3-allyl phenanthrene, 4-allyl phenanthrene, 9-allyl phenanthrene, and combinations thereof.

Example aryl vinylic monomers are 2-phenylethyl acrylate; 3-phenylpropyl acrylate; 4-phenylbutyl acrylate; 5-phenylpentyl (meth)acrylate; 2-benzyloxyethyl (meth)acrylate; 3-benzyloxypropyl (meth)acrylate; 2-[2-(benzyloxy)ethoxy] ethyl (meth)acrylate; p-vinylphenyl-tris(trimethylsiloxy)silane; m-vinylphenyltris(trimethylsiloxy)silane; o-vinylphenyl-tris(trimethylsiloxy)silane; p-styrylethyltris (trimethylsiloxy)silane; m-styrylethyl-tris(trimethylsiloxy) silane; o-styrylethyltris(trimethylsiloxy)silane; or combinations thereof. Examples are p-vinylphenyltris(trimethylsiloxy)silane; m-vinylphenyltris(trimethylsiloxy)silane; o-vinylphenyl-tris(trimethylsiloxy)silane; p-styrylethyltris (trimethylsiloxy)silane; m-styrylethyl-tris(trimethylsiloxy) silane; o-styrylethyltris(trimethylsiloxy)silane; or combinations thereof.

Any aryl vinylic crosslinkers can be used. Examples of aryl vinylic crosslinkers include non-silicone aryl vinylic crosslinkers (e.g., divinylbenzene, 2-methyl-1,4-divinylbenzene, bis(4-vinylphenyl)methane, 1,2-bis(4-vinylphenyl) ethane, etc.), silicone-containing aryl vinylic crosslinkers.

Example silicone-containing aryl vinylic crosslinkers are aryl-containing polysiloxane vinylic crosslinkers each of which comprises: (1) a polydiorganosiloxane segment comprising dimethylsiloxane units and aryl-containing siloxane units each having at least one aryl-containing substituent having up to 45 carbon atoms; and (2) ethylenically-unsaturated groups (such as (meth)acryloyl groups). In some embodiments, the polydiorganosiloxane segment comprises at least 25% by mole of the aryl-containing siloxane units. The aryl-containing polysiloxane vinylic crosslinkers can have a number average molecular weight of at least 1000 Daltons (such as from 1500 Daltons to 100000 Daltons, such as from 2000 to 80000 Daltons, such as from 2500 to 60000 Daltons).

Examples of such aryl-containing polysiloxane vinylic crosslinkers include w vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), (meth)acryloxyalkyl-terminated polyphenylmethysiloxanes, (meth)acryloxyalkyl-terminated phenylmethyl-vinylphenylsiloxane copolymers, (meth)acryloxyalkyl-terminated diphenylsiloxane-dimethylsiloxane copolymers, ethylenically-unsaturated group-terminated dimethylsiloxane-arylmethylsiloxane copolymers disclosed in U.S. Pat. Appl. Pub. No. 2022/00306810, or combinations thereof.

An insert-forming composition can further comprise one or more hydrophobic acrylic monomers free of aryl group (e.g., silicone-containing acrylic monomers, non-silicone hydrophobic acrylic monomers, vinyl alkanoates, vinyloxyalkanes, or combinations thereof), vinylic crosslinkers free of aryl group (e.g., acrylic crosslinking agents (crosslinkers) as described below, allyl methacrylate, allyl acrylate, triallyl isocyanurate, 2,4,6-triallyloxy-1,3,5-triazine, 1,2,4-trivinylcyclohexane, or combinations thereof), at least one UV-absorbing vinylic monomer (any one of those described later in this application), at least one photochromic vinylic monomer (any one of those described later in this application), or combinations thereof.

Examples of silicone-containing acrylic monomers free of aryl group can be any one of those described below in this application; examples of non-silicone hydrophobic acrylic monomers free of aryl group can be any one of those described below in this application.

Examples of acrylic crosslinkers free of aryl group include ethylene glycol di-(meth)methacrylate; 1,3-propanediol di-(meth)acrylate; 2,3-propanediol diacrylate; 2,3-propanediol di-(meth)acrylate; 1,4-butanediol di-(meth)acrylate; 1,5-pentanediol di-(meth)acrylate; 1,6-hexanediol di-(meth)acrylate; diethylene glycol di-(meth)acrylate; triethylene glycol di-(meth)acrylate; tetraethylene glycol di-(meth)acrylate; glycerol 1,3-diglycerolate di-(meth)acrylate, ethylenebis[oxy(2-hydroxypropane-1,3-diyl)]di-(meth) acrylate, bis[2-(meth)acryloxyethyl]phosphate, trimethylolpropane di-(meth)acrylate, 3,4-bis[(meth)acryloyl]-tetrahydrofuran, diacrylamide, dimethacrylamide, N,N-di (meth)acryloyl-N-methylamine, N,N-di(meth)acryloyl-N-ethylamine, N,N'-methylene bis(acrylamide); N,N'-methylene bis(methacrylamide); N,N'-ethylene bis (acrylamide); N,N'-ethylene bis(methacrylamide); N,N'-hexamethylene bisacrylamide; N,N'-hexamethylene bismethacrylamide; N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidopropane-2-yl dihydrogen phosphate, piperazine diacrylamide, pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloylhexahydro-1,3,5-triazine, 1,3,5-trimethacryloxylhexahydro-1,3,5-triazine; pentaerythritol tetraacrylate, pentaerythritol tetramethacrylate, di(trimethylol-propane) tetraacrylate, di(trimethyloylpropane) tetramethacrylate, or combinations thereof.

In some embodiments, the polymerizable composition for forming hydrophobic insert comprises at least one acrylic crosslinking agent (any one of those described above).

An insert-forming composition can be prepared by mixing all polymerizable materials as described above in the desired proportions, together with one or more polymerization initiators (thermal polymerization initiators or photoinitiators) in the presence or in the absence of a non-reactive organic solvent (i.e., a non-reactive diluent).

Any suitable thermal polymerization initiator can be used. Suitable thermal polymerization initiators are known to the skilled artisan and comprise, for example, peroxides, hydroperoxides, azo-bis(alkyl- or cycloalkylnitriles), persulfates, percarbonates, or mixtures thereof. Examples of thermal polymerization initiators include benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis (2-amidinopropane) dihydrochloride (VAZO 50), 2,2'-azobis(2,4-dimethylvaleronitrile) (VAZO 52), 2,2'-azobis (isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. For example, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, such as Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylphosphine oxide; bis-(2,6-dichlorobenzoyl)-4-N-propylphenylphosphine oxide; and bis-(2,6-dichlorobenzoyl)-4-N-butylphenylphosphine oxide.

Reactive photoinitiators which can be incorporated, for example, into a macromer or can be used as a special monomer are also suitable. Examples of reactive photoinitiators are those disclosed in EP 632 329.

Outer Hydrogel Layers

A contact lens of the present disclosure (with or without inserts) may optionally include a layered structural configuration from the anterior surface to the posterior surface, where the layered structural configuration includes an anterior outer hydrogel layer, an inner layer of a silicone hydrogel material, and a posterior outer hydrogel layer. For example, a contact lens includes an inner (middle) layer and two outer layers. The inner layer is the bulk material of SiHy lens. The inner layer can include a lower water content silicone hydrogel. The two outer layers may be very similar to each other and are substantially uniform in thickness and made of a hydrogel material substantially free of silicone and having a higher water content relative to that of the inner layer. The two outer layers merge at a peripheral edge of the contact lens and cover the inner layer.

The two outer hydrogel layers of a SiHy contact lens of the present disclosure can be substantially identical to each other and are a crosslinked coating which is applied onto a preformed SiHy contact lens, for example, as described in U.S. Pat. No. 8,939,577, incorporated herein by reference in its entirety.

The two outer hydrogel layers of a SiHy contact lens can be substantially uniform in thickness. They merge at the peripheral edge of the contact lens to completely enclose the inner layer of the silicone hydrogel material. The thickness of each outer hydrogel layer is from about 0.1 m to about 20 m, such as about 0.25 m to about 15 m, such as about 0.5 m to about 12.5 m, such as about 1 m to about 10 m. The thickness of the outer hydrogel layers (or crosslinked coating) of a SiHy contact lens is determined by AFM analysis of a cross section of the SiHy contact lens in fully hydrated state. In some embodiments, the thickness of each outer hydrogel layer is at most about 30% or less, such as at most about 20% or less, such as at most about 10% (10% or less) of the center thickness of the SiHy contact lens in fully hydrated state. Each of the two outer hydrogel layers is substantially free of silicone, such as totally free of silicone. Each outer hydrogel layer of a SiHy contact lens of the present disclosure is substantially free of silicon, as characterized by having a silicon atomic percentage of about 5% or less, such as about 4% or less, such as about 3% or less, of total elemental percentage, as measured by XPS analysis of the contact lens in dried state. It is understood that a small percentage of silicone may be optionally (but preferably not) incorporated into the polymer network of the outer hydrogel layer so long as it would not significantly deteriorate the surface properties (hydrophilicity, wettability, and/or lubricity) of a SiHy contact lens.

The anterior and posterior outer hydrogel layers (the crosslinked coating) have a crosslinking density (or crosslink density) sufficiently low to provide the crosslinked coating or the outer hydrogel layers (i.e., the SiHy contact lens) with a high digital-rubbing resistance as characterized by having no surface cracking lines visible under dark field after the SiHy contact lens is rubbed between fingers. It is believed that digital-rubbing-induced surface cracking may reduce the surface lubricity and/or may not be able prevent silicone from migrating onto the surface (exposure).

The anterior and posterior surfaces have a low surface concentration of negatively-charged groups including carboxylic acid groups. In some embodiments, the anterior and posterior outer hydrogel layers have a carboxylic acid content of about 20% by weight or less, such as about 15% by weight or less, such as about 10% by weight or less, such as about 5% by weight or less.

In some embodiments, a SiHy contact lens of the present disclosure further comprises, in its layered structural configuration, two transition layers of polymeric material(s), each of the two transition layers located between the inner layer and one of the two outer hydrogel layers. Each transition layer can be substantially uniform in thickness. The thickness of each transition layer is at least about 0.05 m, such as about 0.05 m to about 10 m, such as about 0.1 m to about 7.5 m, such as about 0.15 m to about 5 m.

The two transition layers of a SiHy contact lens are a base (or primer) coating which is applied onto a preformed SiHy contact lens, before the crosslinked coating (the outer hydrogel layers) is applied thereon. The transition layers (base coating) function to anchor/attach the outer hydrogel layers. In some embodiments, the transition layers comprise a carboxyl (COOH)-containing polymer, such as a homo or copolymer of acrylic acid or methacrylic acid or $C_2$-$C_{12}$ alkylacrylic acid.

In at least one embodiment, the water-soluble and crosslinkable hydrophilic polymeric material for forming the outer hydrogel layers (or crosslinked coating) comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from an amino group, a carboxyl group, a thiol group, or combination thereof, wherein the hydrophilic moieties or second polymer chains are covalently attached to the first polymer chains through one or more covalent linkages each formed between one azetidinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains.

Methods of Making Contact Lenses by Pad Printing

Contact lenses of the present disclosure can be produced using any suitable method. For example, a contact lens (with or without outer hydrogel layers) can be obtained commercially and imprinted with colorant (e.g., pad printing the colorants onto the contact lenses at locations such as the inner zone and peripheral zone(s)).

In some embodiments, a contact lens of the present disclosure is prepared by diamond turning, femto-second laser processes, contact lens printing processes, and methods to create hybrid contact lenses.

As mentioned above, the contact lenses can be made of a polymeric material. The polymeric material can be a silicone hydrogel (SiHy). SiHy contains polydimethylsiloxane in addition to a hydrophilic polymer phase forming a microphase separated structure.

In some aspects, contact lens are made by: (1) obtaining preformed silicone hydrogel contact lens; (2) drying the silicone hydrogel contact lens; (3) optionally disposing one or more outer hydrogel layers onto the contact lens; (4) before or after process (3), optionally disposing (e.g., pad printing) a first colorant and/or compound onto a first (central) zone of each of the contact lenses; (5) independently before or after processes (3) or (4), pad printing a second colorant and/or compound onto a second (peripheral) zone of each of the contact lenses; (5) washing the contact lenses having first and/or second colorant and/or compound disposed thereon; and (6) packaging and autoclaving the silicone hydrogel contact lenses obtained in process (5) in a packaging solution in a sealed lens package, wherein each of the contact lenses in fully hydrated state includes a bulk silicone hydrogel material and repeating units of (a) at least one hydrophilic vinylic monomer, (b) at least one siloxane-containing vinylic monomer and/or at least one polysiloxane vinylic crosslinker, and (c) at least one UV-absorbing vinylic monomer.

In some aspects, contact lenses are made by (1) introducing a polymerizable composition into a mold, wherein the polymerizable composition comprises (a) at least one hydrophilic vinylic monomer, (b) at least one siloxane-containing vinylic monomer and/or at least one polysiloxane vinylic crosslinker, (c) at least one UV-absorbing vinylic monomer, and (d) from about 0.2% to about 1.5% by weight of at least one free-radical initiator, wherein the mold comprises a female mold halve having a first molding surface and a male mold half having a second molding surface, wherein the mold halves are configured to receive each other such that a lens-forming cavity is formed between the first molding surface and the second molding surface; (2) curing the polymerizable composition in the mold to form a silicone hydrogel contact lens precursor; (3) removing the silicone hydrogel contact lens precursor from the mold; and subjecting the silicone hydrogel contact lens precursor to one or more post-molding processes selected from extraction, hydration, surface treatment, packaging, sterilization, or combinations thereof, (4) optionally disposing one or more outer hydrogel layers onto the contact lens, (5) independently before or after processes (3) or (4), optionally disposing (e.g., pad printing) a first colorant and/or compound onto a first (central) zone of each of the contact lenses; (6) independently before or after processes (3), (4), or (5), pad printing a second colorant and/or compound onto a second (peripheral) zone of each of the contact lenses; (6) washing the contact lenses having first and/or second colorant and/or compound disposed thereon.

All of the various embodiments of polymerizable compositions, hydrophilic vinylic monomers, silicone-containing vinylic monomers, polysiloxane vinylic crosslinkers, UV-absorbing vinylic monomers, non-silicone hydrophobic vinylic monomers, non-silicone vinylic crosslinkers, free-radical initiators, molds, thermal curing, photocuring, demolding, delensing, extraction, hydration, surface treatment, packaging, and autoclaving have been described above and can be used in these aspects of the present disclosure.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e., first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the polymerizable composition.

The mold halves can be formed through various techniques, such as injection molding. Methods of manufacturing mold halves for cast-molding a contact lens are generally well known to those of ordinary skill in the art. The processes of the present disclosure is not limited to any particular method of forming a mold. In fact, any method of forming a mold can be used. The mold halves can be formed through various techniques, such as injection molding or lathing. Examples of suitable processes for forming the mold halves are disclosed in U.S. Pat. Nos. 4,444,711; 4,460,534; 5,843,446; and 5,894,002.

Any suitable materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

A polymerizable composition can be introduced (dispensed) into a cavity formed by a mold according to any suitable known methods.

After the polymerizable composition is dispensed into the mold, it is polymerized to produce a contact lens. Crosslinking may be initiated thermally or actinically to crosslink the polymerizable components in the polymerizable composition.

The thermal polymerization is carried out conveniently, for example, at a temperature of 25 to 120° C., or 40 to 100° C. The reaction time may vary within wide limits, but is conveniently, for example, 30 minutes to 4 hours, or 1 to 2 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example, a visible light of a suitable wavelength.

After the curing process, the processes of opening a mold (i.e., separating the male mold half from the female mold half with the contact lens attached onto one of the male and female mold halves and delensing (i.e., removing the contact lens from the lens adhered mold half) are carried out according to any techniques known to a person skilled in the art.

After the molded contact lens is delensed, it typically is extracted with an extraction medium as well known to a person skilled in the art. The extraction liquid medium is any solvent capable of dissolving the diluent(s), unpolymerized polymerizable materials, and oligomers in the lens precursor. Water, any organic solvents described above or known to a person skilled in the art, or a mixture thereof can be used.

The extracted contact lens can be further subjected to surface treatment to form coating on the surfaces of the preformed contact lenses.

The extracted and/or surface-treated contact lenses can then be dehydrated according to any method known to a person skilled in the art to obtain contact lenses in dry state.

Lens packages (or containers) are well known to a person skilled in the art for autoclaving and storing a soft contact lens. Any lens packages can be used. For example, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

A contact lens of the present disclosure can have an oxygen permeability of at least about 40 barrers, such as at least about 60 barrers, such as at least about 80 barrers (at about 35° C.).

A contact lens of the present disclosure can have an elastic modulus of about 1.5 MPa or less, such as about 1.2 MPa or less, such as about 0.3 MPa to about 1.0 MPa (at a temperature of from about 22° C. to 28° C.).

A contact lens of the present disclosure can further have an equilibrium water content of about 15% to about 75%, such as about 20% to about 70% by weight, such as about 25% to about 65% by weight (at room temperature) when fully hydrated. The equilibrium water content of a photochromic SiHy contact lens can be measured according to the procedure disclosed in Example 1.

Methods of Forming Contact Lenses Having an Insert

The central area of the molding surface of the female mold half can be treated with a corona or Argon plasma and a vacuum UV according to any techniques known to a person skilled in the art. For example, the molding surface can be covered with a mask having a circular opening which limits the area of the molding surface of the female mold half to be treated with a corona or Argon plasma or a vacuum UV.

The present disclosure provides, in one aspect, a method for producing embedded hydrogel contact lenses (e.g., embodiments of FIG. 2), the method including the processes of: (1) obtaining a female mold half, a first male mold half and a second male mold half, wherein the female mold half has a first molding surface defining the anterior surface of a contact lens to be molded and also the front surface of an insert to be molded, wherein the first male mold half has a second molding surface defining the back surface of the insert to be molded, wherein the second male mold half has a third molding surface defining the posterior surface of the contact lens to be molded, wherein the first male mold half and the female mold half are configured to receive each other such that an insert-molding cavity is formed between the second molding surface and a central portion of the first molding surface when the female mold half is closed with the first male mold half, wherein the second male mold half and the female mold half are configured to receive each other such that a lens-molding cavity is formed between the first and third molding surfaces when the female mold half is closed with the second male mold half, wherein the second molding surface of the first male mold half has a circular protrusion configured to provide a circular first zone of the insert (which provides a first (inner) zone of the final contact lens), wherein the third molding surface of the second male mold half does not have a circular protrusion (which provides contact lens forming composition to be provided into an inner circular portion of the insert during contact lens formation); (2) dispensing an amount of an insert-forming composition (including colorant and/or compound) near or on the central portion of the first molding surface of the female mold half, (3) placing the first male mold half on top of the insert-forming composition in the female mold half and closing the first male mold half and the female mold half to form a first molding assembly comprising the insert-forming composition within the insert-molding cavity; (4) curing the insert-forming composition in the insert-molding cavity of the first molding assembly to form a molded insert made of a crosslinked polymeric material formed from the insert-forming composition, wherein the insert has a circular first zone of the insert (which provides a first (inner) zone of the final contact lens); (5) separating the first molding assembly obtained in step (4) into the first male mold half and the female mold half with the molded insert that is adhered onto the central portion of the first molding surface; (6) dispensing a lens-forming composition in the female mold half with the molded insert adhered thereon in an amount sufficient for filling the lens-molding cavity (including the circular zone of the insert), wherein the lens-forming composition comprises (a) from about 0.1% to about 5% (such as about 0.2% to about 4%, such as about 0.3% to about 4%, such as about 0.5% to about 4%) by weight of at least one non-silicone vinylic crosslinking agent which capable of swelling the molded insert by a first swelling degree, (b) from about 10% to about 35% (such as about 15% to about 35%, such as about 20% to about 30%) by weight of a non-reactive organic solvent for dissolving all polymerizable components in the lens-forming composition, and (c) at least one free-radical initiator (photoinitiator or thermal initiator), wherein the non-reactive organic solvent is capable of swelling the molded insert by a swelling degree, wherein the first and second swelling degrees independent of each other are from about 12.5% to about 25% (such as about 15% to about 23%, such as about 17% to about 21%); (7) placing the second male mold half on top of the lens-forming composition in the female mold half and closing the second male mold half and the female mold half to form a second molding assembly comprising the lens-forming composition and the molded insert immersed therein in the lens-molding cavity; (8) curing the lens-forming composition in the lens-molding cavity of the second molding assembly to form an embedded hydrogel contact lens precursor that comprises a bulk hydrogel material formed from the lens-forming composition and the insert embedded in the bulk material; (9) separating the second molding assembly obtained in step (8) into the second male mold half and the female mold half, with the embedded hydrogel contact lens precursor adhered on a lens-adhered mold half which is one of the female and second male mold halves; (10) removing the embedded hydrogel contact lens precursor from the lens-adhered mold half, and (11) subjecting the embedded hydrogel contact lens precursor to post-molding processes including one or more processes selected from extraction, hydration, surface treatment, packaging, sterilization, and combinations thereof to obtain an embedded hydrogel contact lens.

In some embodiments, a method further comprises, before process (2) above, a process of treating a central circular area of the first molding surface by using a vacuum UV or a corona or Argon plasma, wherein the central circular area has a diameter equal to or smaller than the diameter of the insert to be molded. When the back surface of a molded insert comprises a diffractive structure, the molded insert would have a great tendency to stick (adhere) to the male mold half during the separation of the insert molding assembly. However, when the molding surface of the female mold has been treated with a corona or Argon plasma or a vacuum UV in a central circular area having a diameter equal to or less than the diameter of the insert, the molded insert can consistently adhere to the female mold half during the separation of the insert molding assembly.

In some embodiments, the first male mold half having a molding surface defining back surface of the insert comprises an overflow groove which surrounds the molding surface and receives any excess insert-forming material when the molding assembly is closed. By having such an overflow groove, one can ensure that any flushes formed from the excess insert-forming material during molding of the insert can be stuck on the male mold half during the step of separating the molding assembly, thereby removing the flushes.

In some embodiments, a method for producing embedded hydrogel contact lenses (e.g., embodiments of FIG. 3) comprises the processes of: (1) obtaining a first female mold half, a male mold half and a second female mold half, wherein the first female mold half has a first molding surface defining the front surface of an insert to be molded, wherein the male mold half has a second molding surface defining the posterior surface of a contact lens to be molded and also the back surface of the insert to be molded, wherein the second female mold half has a third molding surface defining the anterior surface of the contact lens to be molded, wherein the first female mold half and the male mold half are configured to receive each other such that an insert-molding cavity is formed between the first molding surface and a central portion of the second molding surface when the male mold half is closed with the first female mold half, wherein the male mold half and the second female mold half are configured to receive each other such that a lens-molding cavity is formed between the second and third molding surfaces when the male mold half is closed with the second female mold half, wherein the first molding surface of the first female mold half has a circular protrusion configured to provide a circular first zone of the insert (which provides a first (inner) zone of the final contact lens), wherein the third molding surface of the second female mold half does not have a circular protrusion (which provides contact lens forming composition to be provided into an inner circular portion of the insert during contact lens formation); (2) dispensing an amount of an insert-forming composition (including colorant and/or compound) in the first female mold half, (3) placing the male mold half on top of the insert-forming composition in the first female mold half and closing the male mold half and the first female mold half to form a first molding assembly comprising the insert-forming composition within the insert-molding cavity; (4) curing the insert-forming composition in the insert-molding cavity of the first molding assembly to form a molded insert made of a crosslinked polymeric material formed from the insert-forming composition, wherein the insert has a circular first zone of the insert (which provides a first (inner) zone of the final contact lens); (5) separating the first molding assembly obtained in step (4) into the first female mold half and the male mold half with the molded insert that is adhered onto the central portion of the second molding surface; (6) dispensing a lens-forming composition in the second female mold half in an amount sufficient for filling the lens-molding cavity (including the circular zone of the insert), wherein the lens-forming composition comprises (a) about 0.1% to about 5% (such as about 0.2% to about 4%, such as about 0.3% to about 4%, such as about 0.5% to about 4%) by weight of at least one non-silicone vinylic crosslinking agent which is capable of swelling the molded insert by a first swelling degree, (b) about 10% to about 35% (such as about 15% to about 35%, such as about 20% to about 30%) by weight of a non-reactive organic solvent for dissolving all polymerizable components in the lens-forming composition, and (c) at least one free-radical initiator (photoinitiator or thermal initiator), wherein the non-reactive organic solvent is capable of swelling the molded insert by a swelling degree, wherein the first and second swelling degrees independent of each other are about 12.5% to about 25% (such as about 15% to about 23%, such as about 17% to about 21%); (7) placing the male mold half with the molded insert adhered thereonto on top of the lens-forming composition in the second female mold half and closing the male mold half and the second female mold half to form a second molding assembly comprising the lens-forming composition and the molded insert immersed therein in the lens-molding cavity; (8) curing the lens-forming composition in the lens-molding cavity of the second molding assembly to form an embedded hydrogel contact lens precursor that comprises a bulk hydrogel material formed from the lens-forming composition and the insert embedded in the bulk material; (9) separating the second molding assembly obtained in step (8) into the male mold half and the second female mold half, with the embedded hydrogel contact lens precursor adhered on a lens-adhered mold half which is one of the male or second female mold halves; (10) removing the embedded hydrogel contact lens precursor from the lens-adhered mold half, and (11) subjecting the embedded hydrogel contact lens precursor to post-molding processes including one or more processes selected from extraction, hydration, surface treatment, packaging, sterilization, and combinations thereof to obtain an embedded hydrogel contact lens.

In some embodiments, a method further comprises, before process (2), a process of treating a central circular area of the second molding surface by using a vacuum UV or a corona or Argon plasma, wherein the central circular area has a diameter equal to or smaller than the diameter of the insert to be molded. When the front surface of a molded insert comprises a diffractive structure, the molded insert would have a great tendency to stick (adhere) to the female mold half during the separation of the insert molding assembly. However, when the molding surface of the male mold has been treated with a corona or Argon plasma or a vacuum UV in a central circular area having a diameter equal to or less than the diameter of the insert, the molded insert can consistently adhere to the male mold half during the separation of the insert molding assembly.

In some embodiments, the first female mold half having a molding surface defining front surface of the insert comprise an overflow groove which surrounds the molding surface and receives any excess insert-forming material when the molding assembly is closed. By having such an overflow groove, one can ensure that any flushes formed from the excess insert-forming material during molding of the insert can be stuck on the female mold half during the step of separating the molding assembly, thereby removing the flushes.

Mold halves for making contact lenses (or inserts) are well known to a person skilled in the art and, for example, are employed in cast molding. In general, a molding assembly comprises at least two mold halves, one male half and one female mold half. The male mold half has a first molding (or optical) surface which is in direct contact with a polymerizable composition for cast molding of a contact lens (or an insert) and defines the posterior (back) surface of a molded contact lens (or a molded insert); and the female mold half has a second molding (or optical) surface which is in direct contact with the polymerizable composition and defines the anterior (front) surface of the molded contact lens (or molded insert). The male and female mold halves are configured to receive each other such that a lens- or insert-forming cavity is formed between the first molding surface and the second molding surface.

Methods of manufacturing mold halves for cast-molding a contact lens or an insert are generally well known to those of ordinary skill in the art. The processes of the present disclosure are not limited to any particular method of forming a mold half. In fact, any suitable method of forming a mold half can be used. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making mold halves can be used to make mold halves for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used.

An insert-forming composition of the present disclosure can be a solventless clear liquid prepared by mixing all polymerizable components (or materials) and other necessary component (or materials) or a solution prepared by dissolving all of the desirable components (or materials) in any suitable solvent, such as, a mixture of water and one or more organic solvents miscible with water, an organic solvent, or a mixture of one or more organic solvents, as known to a person skilled in the art. The term "solvent" refers to a chemical that does not participate in free-radical polymerization reaction (any of those solvents as described later in this application).

Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. Example organic solvents include methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, dimethylcyclopentane (various isomers), 2,2,4-trimethylpentane, and mixtures thereof.

A lens-forming composition can be prepared by dissolving all of the polymerizable components and other non-polymerizable component in the non-reactive organic solvent, as known to a person skilled in the art.

The insert-forming composition and the lens-forming composition can be introduced into the insert-molding cavity and the lens-molding cavity respectively according to any techniques known to a person skilled in the art.

The curing of the insert-forming composition within the insert-molding cavity of the closed first molding assembly and the lens-forming composition within the lens-molding cavity of the closed second molding assembly can be carried out thermally (i.e., by heating) or actinically (i.e., by actinic radiation, e.g., UV radiation and/or visible radiation) to activate the polymerization initiators.

The actinic polymerization of the insert- or lens-forming composition in a molding assembly can be carried out by irradiating the closed molding assembly with the insert- or lens-forming composition therein with an UV or visible light, according to any techniques known to a person skilled in the art.

The thermal polymerization of the insert- or lens-forming composition in a molding assembly can be carried out conveniently in an oven at a temperature of from 25 to 120° C. and such as 40 to 100° C., as well known to a person skilled in the art. The reaction time may vary within wide limits, but is conveniently, for example, from 1 to 24 hours or such as from 2 to 12 hours. It is advantageous to previously degas the silicone-hydrogel-lens-forming composition and to carry out said copolymerization reaction under an inert atmosphere, e.g., under $N_2$ or Ar atmosphere.

The process of separating the first molding assembly can be carried out according to any techniques known to a person skilled in the art. It is understood that the molded insert is adhered onto the female mold. As an illustrative example, the first male mold half can be blasted with liquid nitrogen for several seconds and then pinched.

The process of separating the second molding assembly can be carried out according to any techniques known to a person skilled in the art. It is understood that the molded embedded hydrogel contact lens can be adhered onto either one of the two mold halves of the second molding assembly. As an illustrative example, a compression force can be applied by using a mold-opening device to non-optical surface (opposite to the molding surface) of one of the mold halves (not adhering the molded insert) of the second molding assembly at a location about the center area of non-optical molding surface at an angle of less than about 30 degrees, such as less than about 10 degrees, such as less than about 5 degrees (i.e., in a direction substantially normal to center area of non-optical molding surface) relative to the axis of the mold to deform the mold half, thereby breaking bonds between the molding surface of the mold half and the molded lens. Various ways of applying a force to non-optical surface of the mold half at a location about the center area of non-optical molding surface along the axis of the mold to deform the mold half which breaks the bonds between the optical molding surface of the mold half and the molded lens. It is understood that the mold-opening device can have any configurations known to a person skilled in the art for performing the function of separating two mold halves from each other.

The embedded hydrogel contact lens precursor can be delensed (i.e., removed) from the lens-adhered mold half according to any techniques known to a person skilled in the art.

After the embedded hydrogel contact lens precursor is delensed, it typically is extracted with an extraction medium as well known to a person skilled in the art. The extraction liquid medium is any solvent capable of dissolving the diluent(s), unpolymerized polymerizable materials, and oligomers in the embedded SiHy contact lens precursor. Water, any organic solvents known to a person skilled in the art, or a mixture thereof can be used. For example, the extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded hydrogel contact lens can then be hydrated according to any method known to a person skilled in the art.

The hydrated embedded hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used. For example, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In a further aspect, the present disclosure provides an embedded hydrogel contact lens, comprising a lens body that comprises an anterior surface, an opposite posterior surface, a bulk hydrogel material having a first refractive index, and a circular insert (second periphery zone) embedded in the bulk hydrogel material, wherein the circular insert has a colorant and/or compound and has a diameter of about 10 mm or less (and is optionally made of a crosslinked polymeric material having a second refractive index and different from the bulk hydrogel material), wherein the circular insert has a front surface and an opposite back surface and is located in a central portion of the embedded SiHy contact lens and concentric with a central axis of the lens body, wherein one of the front and back surfaces of the circular insert merges with one of the anterior and posterior surface of the lens body while the other one of the front and back surfaces of the circular insert is buried within the bulk hydrogel material and designated as buried surface, wherein the bulk hydrogel material comprises repeating units of ethyleneglycol dimethacrylate, wherein the crosslinked polymeric material and the bulk hydrogel material interlock with each other in a surface layer on the back surface of the insert to ensure that the embedded hydrogel contact lens is not susceptible to delamination and deformation, wherein the second refractive index is at least 0.03 higher than the first refractive index, wherein the crosslinked polymeric material comprising repeating units of at least one aryl vinylic monomer and at least one aryl vinylic crosslinker.

EMBODIMENTS

The present disclosure is further directed to the following embodiments which may be combined with any embodiments described herein.

Clause 1. A contact lens for slowing the progression of myopia, comprising:

- a circular first zone extending from an optical center of the contact lens to a first boundary, the first zone having a first visible light transmission profile; and
- an annular second zone abutting the first zone at the first boundary, the annular second zone at least partially surrounding the first zone and extending from the first boundary to a second boundary, the second zone having the same dioptric power as a dioptric power of the first zone, the second zone having a second visible light transmission profile that is different than the first transmission profile and is a light transmission profile of about 380 nm to about 500 nm.

Clause 2. The contact lens of Clause 1, wherein the circular first zone has a diameter of about 2 mm to about 5 mm.

Clause 3. The contact lens of Clauses 1 or 2, wherein the circular first zone has a diameter of about 2.5 mm to about 3.5 mm.

Clause 4. The contact lens of any of Clauses 1 to 3, wherein is the second zone has a diameter of greater than 2 mm to about 10 mm.

Clause 5. The contact lens of any of Clauses 1 to 4, wherein is the second zone has a diameter of about 5 mm to about 9 mm.

Clause 6. The contact lens of any of Clauses 1 to 5, wherein the first light transmission profile is configured such that, with respect to light passing through the first zone, the percentage transmission of at least a portion of such light having wavelengths above 500 nm is greater than seventy percent.

Clause 7. The contact lens of any of Clauses 1 to 6, wherein the second light transmission profile is configured such that, with respect to light passing through the second zone, the percentage transmission of at least a portion of such light having wavelengths between 480 nm and 650 nm is less than 60 percent.

Clause 8. The contact lens of any of Clauses 1 to 7, wherein the contact lens comprises a silicone hydrogel material.

Clause 9. The contact lens of any of Clauses 1 to 8, wherein the circular first zone comprises a first dye printed on the surface of the silicone hydrogel material.

Clause 10. The contact lens of any of Clauses 1 to 9, wherein the second zone has a uniform dioptric power.

Clause 11. The contact lens of any of Clauses 1 to 10, wherein total zones of the contact lens consist of the first zone and the second zone.

Clause 12. The contact lens of any of Clauses 1 to 11, wherein the first boundary is about 0.5 mm to about 1.5 mm from the optical center.

Clause 13. The contact lens of any of Clauses 1 to 12, wherein the second zone comprises about 1% to about 3% by weight of a first dye configured to transmit light of a wavelength of 400 nm to 480 nm and the percentage transmission of light having wavelengths between 480 nm and 650 nm is less than 60 percent.

Clause 14. The contact lens of any of Clauses 1 to 13, wherein the second zone is configured to provide scattering of incident light.

Clause 15. A contact lens for slowing the progression of myopia, comprising:

- a circular first zone having a diameter of about 2 mm to about 5 mm, the first zone extending from an optical center of the contact lens to a first boundary, the first zone having a first visible light transmission profile; and
- an annular second zone abutting the first zone at the first boundary, the annular second zone at least partially surrounding the first zone and extending from the first boundary to a second boundary, the second zone having a second visible light transmission profile that is different than the first transmission profile and is a light transmission profile of about 380 nm to about 500 nm, wherein the second zone has a diameter of greater than 2 mm to about 10 mm.

Clause 16. The contact lens of Clause 15, wherein the circular first zone has a diameter of about 2.5 mm to about 3.5 mm.

Clause 17. The contact lens of Clauses 15 or 16, wherein the second zone has a diameter of about 5 mm to about 9 mm.

Clause 18. The contact lens of any of Clauses 15 to 17, wherein the first light transmission profile is configured such that, with respect to light passing through the first zone, the percentage transmission of at least a portion of such light having wavelengths below 500 nm is greater than seventy percent.

Clause 19. The contact lens of any of Clauses 15 to 18, wherein the second light transmission profile is configured such that, with respect to light passing through the second zone, the percentage transmission of at least a portion of such light having wavelengths between 480 nm and 650 nm is less than 60 percent.

Clause 20. The contact lens of any of Clauses 15 to 19, wherein the second zone has a uniform dioptric power.

Clause 21. The contact lens of any of Clauses 15 to 17 20, wherein total zones of the contact lens consist of the first zone and the second zone.

Clause 22. The contact lens of any of Clauses 15 to 22, wherein the second zone comprises a dye selected from the group consisting of:

(2-[[4-[2-(2-methylprop-2-enoyloxy)ethylamino]-9,10-dioxoanthracen-1-yl]amino]ethyl 2-methylprop-2-enoate)), (2-[4-[[4-[4-[2-(2-methylprop-2-enoyloxy)ethyl]anilino]-9,10-dioxoanthracen-1-yl]amino]phenyl]ethyl 2-methylprop-2-enoate)), Cu(II)-phthalocyanine, and combinations thereof.

Clause 23. The contact lens of any of Clauses 15 to 22, wherein a difference in dioptric power between the first zone and the second zone is about +/−1 D to about +/−3 D.

Clause 24. The contact lens of any of Clauses 15 to 23, wherein the second zone comprises about 1% to about 3% by weight of a first dye configured to transmit light of a wavelength of 400 nm to 480 nm and the percentage transmission of light having wavelengths between 480 nm and 650 nm is less than 60 percent.

Clause 25. The contact lens of any of Clauses 15 to 24, wherein the second zone is configured to provide scattering of incident light.

EXAMPLES

Transmittance

Contact lenses are manually placed into a specially fabricated sample holder or the like which can maintain the shape of the lens as it would be when placing onto eye. Transmittance of particular zones (central zone or peripheral zone) can be performed by configuring the holder to cover the undesired zone such that light reflects from the cover and is not transmitted therethrough. This holder is then submerged into a 1 cm path-length quartz cell containing phosphate buffered saline (PBS, pH~7.0-7.4) as the reference. A UV/visible spectrophotometer, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 1.0 nm intervals. This data is transposed onto an Excel spreadsheet and used to determine if the lenses conform to Class 1 UV absorbance. Transmittance is calculated using the following equations:

$$UVA\ \%\ T = \text{Average \% Transmission between 315 nm and 380 nm} \times 100$$

$$UVB\ \%\ T = \text{Average \% Transmission between 280 nm and 315 nm} \times 100$$

$$HEVL\ \%\ T = \text{Average \% Transmission between 380 nm and 450 nm} \times 100.$$

Overall, the present disclosure is directed to contact lenses configured to prevent or slow myopia, for example, in children. Contact lenses of the present disclosure provide reduced contrast blue light that can be targeted toward the retinal periphery of the wearer and optionally partially block high contrast blue light from a first (inner) portion. Such embodiments of the present disclosure provide distinct advantages over contact lenses having a large plurality of peripheral, multifocal zones. In addition, contact lenses of the present disclosure negate the inconsistent results of narrow bandwidth light treatments (e.g., narrow bandwidth red light or blue light) and rebound effects that have been observed upon cessation of low-level red light therapy and cessation of prescription atropine treatments.

Not only can contact lenses of the present disclosure maintain blue light protection to the wearer at the center of the retina as provided by most commonly worn contact lenses in the market, but the reduced contrast blue light permitted at the contact lens periphery relative to the high contrast red and green light permitted at the periphery of the contact lens provides anti-myopiagenic benefits to the wearer. For example, anti-myopiagenic benefits can include slowing or preventing axial growth of an eye of children and young adults. In addition, unlike narrow bandwidth light treatments, contact lenses can be worn during everyday life and anti-myopia treatment occurs during this time. Such continuous treatment by allowing blue light at the retinal periphery negates the fixational eye movement restraints of narrow bandwidth light treatments.

Such lenses of the present disclosure also provide distinct advantages over contact lenses having a large plurality of peripheral zones of dual focus lenses. Unlike prior contact lenses, use of a myopic defocus mechanism (dual focus) for lenses of the present disclosure is not required and has been rendered merely optional, providing access to anti-myopiagenic (and/or anti-presbyopic) monofocal lenses. In addition, lenses of the present disclosure that are dual focus can have zones having a larger dioptric power difference (e.g., central zone of 0 dioptric power and peripheral zone of >3) while still providing anti-myopiagenic benefits.

Unless defined otherwise, all technical and scientific terms used herein have the same meaning as commonly understood by one of ordinary skill in the art to which embodiments of the present disclosure belong. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" interchangeably refers to a silicone-containing hydrogel obtained by copolymerization of a polymerizable composition comprising at least one silicone-containing monomer or at least one silicone-containing macromer or at least one crosslinkable silicone-containing prepolymer.

A siloxane, which often also described as a silicone, refers to a molecule having at least one moiety of —Si—O—Si— where each Si atom carries two organic groups as substituents. A polysiloxane refers to a molecule having at least one moiety of —Si—O—(Si—O)n-Si— in which each Si atom carries two organic groups as substituents and n is an integer of 2 or greater.

As used in this application, the term "non-silicone hydrogel" or "non-silicone hydrogel material" interchangeably refers to a hydrogel that is theoretically free of silicon.

An "embedded hydrogel contact lens" refers to a hydrogel contact lens comprising at least one insert which is embedded within the bulk hydrogel material of the embedded hydrogel contact lens to an extent that at most one of the anterior or posterior surfaces of the insert can be exposed fully or partially. It is understood that the material of the insert is different from the bulk hydrogel material of the embedded hydrogel contact lens.

An "insert" refers to any 3-dimensional article which has a dimension of at least 5 microns but is smaller in dimension sufficient to be embedded in the bulk material of an embedded hydrogel contact lens and which is made of a material (such as a non-hydrogel material) that is different from the bulk hydrogel material.

In some embodiments, a non-hydrogel material can be any material that can absorb less than 5% (such as about 4% or less, such as about 3% or less, such as about 2% or less) by weight of water when being fully hydrated.

In some embodiments, an insert of the present disclosure has a thickness less than any thickness of an embedded hydrogel contact lens in the region where the insert is embedded. An insert can be any object have any geometrical shape and can have any desired functions. Examples of inserts include thin rigid inserts for providing rigid center optics for masking astigmatism like a rigid gas permeable (RGP) contact lens, multifocal lens inserts, photochromic inserts, cosmetic inserts having color patterns printed thereon, etc.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (such as about 4% or less, such as about 3% or less, such as about 2% or less).

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (e.g., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as described above).

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=$CH_2$ group. Exemplary ethylenically unsaturated groups include (meth)acryloyl

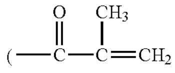 and/or 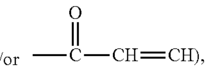

allyl, vinyl, styrenyl, or other C=$CH_2$ containing groups.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

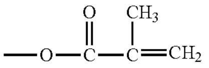 or 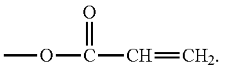

An "(meth)acrylamido monomer" refers to a vinylic monomer having one sole group of

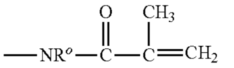 or 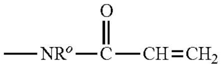

in which $R^o$ is H or $C_1$-$C_4$ alkyl.

The term "aryl vinylic monomer" refers to a vinylic monomer having at least one aromatic ring.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

An "aryl vinylic crosslinker" refers to a vinylic crosslinker having at least one aromatic ring.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); 1H NMR (Proton nuclear magnetic resonance) spectroscopy, etc.

A "polysiloxane segment" or "polydiorganosiloxane segment" interchangeably refers to a polymer chain segment (i.e., a divalent radical) of

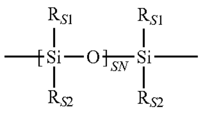

in which SN is an integer of 3 or larger and each of $R_{S1}$ and $R_{S2}$ independent of one another are selected from: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{g1}$—$OR^o$ (in which alk is $C_1$-$C_6$ alkylene diradical, $R^o$ is H or $C_1$-$C_4$ alkyl and g1 is an integer from 1 to 10); a $C_2$-$C_{40}$ organic radical having at least one functional group selected from hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, such as 90% or greater in the range between 400 to 700 nm).

The term "monovalent radical" refers to an organic radical that is obtained by removing a hydrogen atom from an organic compound and that forms one bond with one other group in an organic compound. Examples include alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

The intrinsic "oxygen permeability", $Dk_i$, of a material is the rate at which oxygen will pass through a material. Oxygen permeability is conventionally expressed in units of barrers, where "barrer" is defined as $[(cm^3 \text{ oxygen})(mm)/(cm^2)(sec)(mm\ Hg)]\times10^{-10}$.

The term "modulus" or "elastic modulus" in reference to a contact lens or a material means the tensile modulus or Young's modulus which is a measure of the stiffness of a contact lens or a material.

A "precursor" refers to an insert or contact lens which is obtained by cast-molding of a polymerizable composition in a mold and has not been subjected to extraction and/or hydration post-molding processes (i.e., having not been in contact with water or any organic solvent or any liquid after molding).

A "male mold half" or "base curve mold half" interchangeably refers to a mold half having a molding surface that is a substantially convex surface and that defines the posterior surface of a contact lens or an insert.

A "female mold half" or "front curve mold half" interchangeably refers to a mold half having a molding surface that is a substantially concave surface and that defines the anterior surface of a contact lens or an insert.

The term "anterior surface", "front surface", "front curve surface" or "FC surface" in reference to a contact lens or an insert, as used in this application, interchangeably means a surface of the contact lens or insert that faces away from the eye during wear. The anterior surface (FC surface) is convex.

The "posterior surface", "back surface", "base curve surface" or "BC surface" in reference to a contact lens or insert, as used in this application, interchangeably means a surface of the contact lens or insert that faces towards the eye during wear. The posterior surface (BC surface) is concave.

A "central axis" in reference to a contact lens, as used in this application, means an imaginary reference line passing through the geometrical centers of the anterior and posterior surfaces of a contact lens.

A "central axis" in reference to a mold half, as used in this application, means an imaginary reference line passing normally (i.e., normal to the molding surface at the geometrical center) through the geometrical centers of the molding surface of the mold half.

The term "diameter" in reference to a contact lens or an insert, as used in this application, means the width of the contact lens or the insert from edge to edge.

A corona treatment (aka, so-called a "air plasma") refers to a surface modification technique that uses a low temperature corona discharge plasma to impart changes in the properties of a surface. The corona plasma is generated by the application of high voltage to an electrode that has a sharp tip.

The term "vacuum UV" refers to ultraviolet radiation with wavelengths below 200 nm.

Although various embodiments of the present have been described using specific terms, devices, and methods, such description is for illustrative purposes only. The words used are words of description rather than of limitation. It is to be understood that changes and variations may be made by those skilled in the art without departing from the spirit or scope of the present disclosure, which is set forth in the following claims. In addition, it should be understood that aspects of the various embodiments may be interchanged either in whole or in part or can be combined in any manner and/or used together. It is intended that the specification and examples be considered as exemplary.

What is claimed is:

1. A contact lens for slowing the progression of myopia, comprising:

a circular first zone extending from an optical center of the contact lens to a first boundary, the circular first zone having a first visible light transmission profile; and an annular second zone abutting the circular first zone at the first boundary, wherein:

the annular second zone has at least partially surrounds the circular first zone and extends from the first boundary to a second boundary, the annular second zone has the same dioptric power as a dioptric power of the circular first zone, the annular second zone has a second visible light transmission profile that is different than the first visible light transmission profile, wherein:

the second visible light transmission profile is a light transmission profile of about 380 nm to about 500 nm, and the second visible light transmission profile is configured to provide a percentage transmission of at least 70 percent for light having wavelengths of 380 nm to 500 nm, and the annular second zone comprises about 1% to about 3% by weight of one or more colorants configured to transmit light of a wavelength of 400 nm to 480 nm and to provide a percentage transmission of less than 60 percent for light having wavelengths above 500 nm to 650 nm.

2. The contact lens of claim 1, wherein the circular first zone has a diameter of about 2 mm to about 5 mm.

3. The contact lens of claim 1, wherein the one or more colorants are embedded within a bulk material of the contact lens via an insert.

4. The contact lens of claim 1, wherein the annular second zone comprises a polymeric material that is different than a polymeric material of the circular first zone.

5. The contact lens of claim 4, wherein the one or more colorants are dispersed within the polymeric material of the annular second zone.

6. The contact lens of claim 1, wherein the annular second zone has a diameter of about 5 mm to about 9 mm.

7. The contact lens of claim 1, wherein the one or more colorants are independently selected from the group consisting of an anthraquinone colorant, an anthracenyl colorant, an indolium colorant, and combinations thereof.

8. The contact lens of claim 1, wherein the second boundary separates the annular second zone from a remainder portion of the contact lens, the remainder portion comprising contact lens bulk material free of a colorant.

9. The contact lens of claim 1, wherein the first visible light transmission profile is configured such that, with respect to light passing through the circular first zone, a percentage transmission of at least a portion of such light having wavelengths above 500 nm is greater than seventy percent.

10. The contact lens of claim 1, wherein the contact lens comprises a silicone hydrogel material.

11. The contact lens of claim 1, wherein the annular second zone has a uniform dioptric power.

12. The contact lens of claim 1, wherein total zones of the contact lens consist of the circular first zone and the annular second zone.

13. The contact lens of claim 1, wherein the first boundary is about 0.5 mm to about 1.5 mm from the optical center.

14. A contact lens for slowing the progression of myopia, comprising:

a circular first zone having a diameter of about 2 mm to about 5 mm, the circular first zone extending from an optical center of the contact lens to a first boundary, the circular first zone having a first visible light transmission profile; and an annular second zone abutting the circular first zone at the first boundary, wherein:

the annular second zone at least partially surrounds the circular first zone and extends from the first boundary to a second boundary, the annular second zone comprising one or more colorants and having a second visible light transmission profile that is different than the first visible light transmission profile, wherein:

the second visible light transmission profile is a light transmission profile of about 380 nm to about 500 nm, and the second visible light transmission profile is configured to provide a percentage transmission of at least 70 percent for light having wavelengths of 380 nm to 500 nm, and the annular second zone has a diameter of greater than 2 mm to about 10 mm, and the one or more colorants are embedded within a bulk material of the contact lens via an insert.

15. The contact lens of claim 14, wherein the circular first zone has a diameter of about 2.5 mm to about 3.5 mm.

16. The contact lens of claim 14, wherein the annular second zone has a diameter of about 5 mm to about 9 mm.

17. The contact lens of claim 14, wherein the first visible light transmission profile is configured such that, with respect to light passing through the circular first zone, a percentage transmission of at least a portion of such light having wavelengths below 500 nm is greater than seventy percent.

18. The contact lens of claim 14, wherein the second visible light transmission profile is configured such that, with respect to light passing through the annular second zone, a percentage transmission of at least a portion of such light having wavelengths above 500 nm to 650 nm is less than 60 percent.

19. The contact lens of claim 14, wherein the annular second zone has a uniform dioptric power.

20. The contact lens of claim 19, wherein total zones of the contact lens consist of the circular first zone and the annular second zone.

21. The contact lens of claim 20, wherein the one or more colorants are independently selected from the group consisting of:

(2-[[4-[2-(2-methylprop-2-enoyloxy) ethylamino]-9,10-dioxoanthracen-1-yl]amino]ethyl 2-methylprop-2-enoate)), (2-[4-[[4-[4-[2-(2-methylprop-2-enoyloxy) ethyl]anilino]-9,10-dioxoanthracen-1-yl]amino]phenyl]ethyl 2-methylprop-2-enoate)), and combinations thereof.

22. The contact lens of claim 14, wherein a difference in dioptric power between the circular first zone and the annular second zone is about +/−1 D to about +/−3 D.

23. The contact lens of claim 14, wherein the annular second zone comprises about 1% to about 3% by weight of a first dye configured to transmit light of a wavelength of 400 nm to 480 nm and to provide a percentage transmission of less than 60 percent for light having wavelengths above 500 nm to 650 nm.

24. The contact lens of claim 14, wherein the annular second zone is configured to provide scattering of incident light.

25. The contact lens of claim 1, wherein the circular first zone and the annular second zone reduce a contrast of blue light at a periphery of a retina relative to contrasts of red light and green light at the periphery of the retina.

* * * * *